United States Patent
Yoshida et al.

(10) Patent No.: US 10,953,763 B2
(45) Date of Patent: Mar. 23, 2021

(54) BATTERY PACK, POWER STORAGE DEVICE, POWER STORAGE SYSTEM, ELECTRONIC APPLIANCE, ELECTRIC VEHICLE, AND POWER SYSTEM

(71) Applicant: MURATA MANUFACTURING CO., LTD., Kyoto (JP)

(72) Inventors: Naotake Yoshida, Fukushima (JP); Tsutomu Aoyama, Fukushima (JP); Tatsuya Adachi, Fukushima (JP); Hiroaki Ono, Miyagi (JP); Munenori Inden, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 229 days.

(21) Appl. No.: 15/115,774

(22) PCT Filed: May 13, 2015

(86) PCT No.: PCT/JP2015/002426
§ 371 (c)(1),
(2) Date: Aug. 1, 2016

(87) PCT Pub. No.: WO2015/177989
PCT Pub. Date: Nov. 26, 2015

(65) Prior Publication Data
US 2017/0008417 A1 Jan. 12, 2017

(30) Foreign Application Priority Data
May 22, 2014 (JP) .............................. JP2014-105962

(51) Int. Cl.
*B60L 11/18* (2006.01)
*H02J 7/00* (2006.01)
(Continued)

(52) U.S. Cl.
CPC .......... *B60L 53/34* (2019.02); *B60L 11/1864* (2013.01); *B60L 53/20* (2019.02); *B60L 53/302* (2019.02);
(Continued)

(58) Field of Classification Search
None
See application file for complete search history.

(56) References Cited

U.S. PATENT DOCUMENTS

2005/0031945 A1 2/2005 Morita et al.
2008/0286636 A1* 11/2008 Naito .................... H01M 2/105
429/98
(Continued)

FOREIGN PATENT DOCUMENTS

CN 101136464 3/2008
CN 101558514 10/2009
(Continued)

OTHER PUBLICATIONS

Office Action for Japanese counterpart Application No. 2014-105962; dated Feb. 20, 2018; (2 pages).
(Continued)

*Primary Examiner* — Zhongqing Wei
(74) *Attorney, Agent, or Firm* — K&L Gates LLP

(57) ABSTRACT

A battery module, a power storage device, a power storage system, an electronic appliance, an electric vehicle, and a power system that can detect the voltage of a plurality of battery cells more accurately are provided. The power storage device includes a connection terminal portion which is coupled with terminal planes of a plurality of battery cells constituting battery columns. The connection terminal portion includes a coupling portion including a first coupling portion configured to couple at least with a first battery column and a second coupling portion configured to couple
(Continued)

at least with a second battery column adjacent to the first battery column, and an extension portion extended from an end of the coupling portion in a longitudinal direction. The extension portion is provided at a predetermined position.

15 Claims, 25 Drawing Sheets

(51) Int. Cl.
    *H01M 2/20*     (2006.01)
    *H01M 10/42*     (2006.01)
    *H01M 10/0525*     (2010.01)
    *H01M 2/10*     (2006.01)
    *B60L 53/34*     (2019.01)
    *H01M 10/48*     (2006.01)
    *B60L 53/20*     (2019.01)
    *B60L 58/21*     (2019.01)
    *B60L 53/302*     (2019.01)

(52) U.S. Cl.
    CPC ............ *B60L 58/21* (2019.02); *H01M 2/105* (2013.01); *H01M 2/1077* (2013.01); *H01M 2/206* (2013.01); *H01M 10/0525* (2013.01); *H01M 10/425* (2013.01); *H01M 10/482* (2013.01); *H02J 7/007* (2013.01); *H02J 7/0021* (2013.01); *H02J 7/0045* (2013.01); *H01M 2010/4278* (2013.01); *H01M 2220/20* (2013.01)

(56) References Cited

U.S. PATENT DOCUMENTS

| | | | |
|---|---|---|---|
| 2013/0249446 A1 | 9/2013 | Kumagai | |
| 2013/0260264 A1* | 10/2013 | Shimizu | H01M 12/08 429/405 |
| 2013/0316202 A1 | 11/2013 | Bang et al. | |

FOREIGN PATENT DOCUMENTS

| | | | |
|---|---|---|---|
| CN | 102044652 | | 5/2011 |
| CN | 102356506 | | 2/2012 |
| EP | 2426775 A1 | | 3/2012 |
| JP | 2000-182583 A | | 6/2000 |
| JP | 2004-031284 A | | 1/2004 |
| JP | 2005-056721 A | | 3/2005 |
| JP | 2005-317458 | | 11/2005 |
| JP | 2005-317458 A | | 11/2005 |
| JP | 4761726 | | 11/2005 |
| JP | 2005317458 A | * | 11/2005 |
| JP | 2008-198435 A | | 8/2008 |
| JP | 2008-541386 A | | 11/2008 |
| JP | 2009-123371 A | | 6/2009 |
| JP | 2010-282811 A | | 12/2010 |
| JP | 2011-521403 A | | 7/2011 |
| JP | 2012-125045 A | | 6/2012 |
| JP | 6030499 B2 | | 9/2012 |

OTHER PUBLICATIONS

European Office Action dated Jul. 23, 2018 in corresponding European Application No. 15 725 432.7.
Japan Patent Office, Office Action issued in JP Patent Application No. 2014-105962 (related to above-captioned patent application), dated Nov. 21, 2017.
Chinese Office Action dated Sep. 10, 2018 in corresponding Chinese Application No. 2015800261790.
Chinese Search Report dated Aug. 29, 2018 for corresponding Chinese Application No. 2015800261790.
International Search Report issued in international application No. PCT/JP2015/002426, dated Aug. 4, 2015, 3 pages.
Chinese Office Action dated Apr. 22, 2019 in corresponding Chinese Application No. 201580026179.0.

* cited by examiner

[Fig. 1]
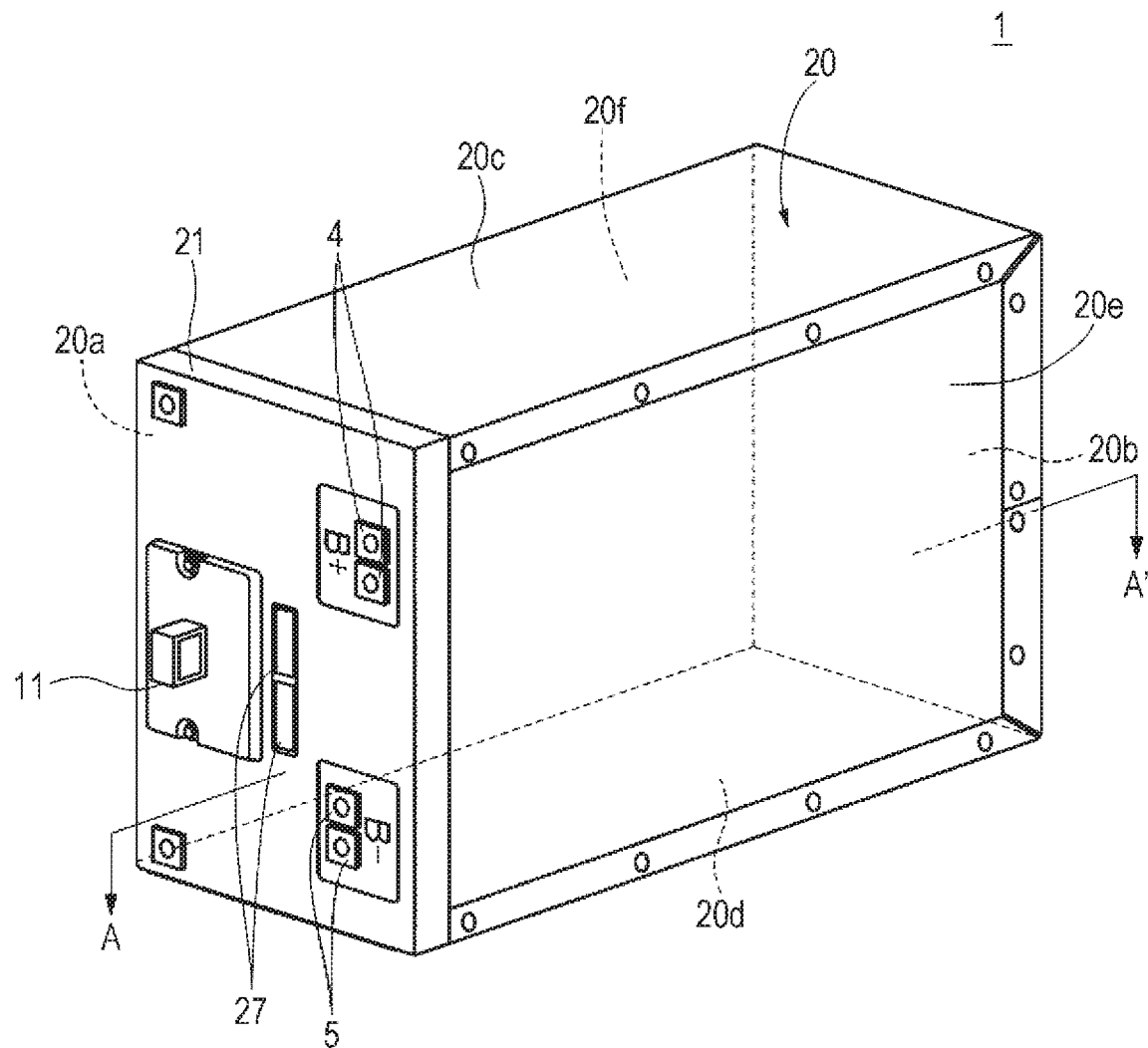

[Fig. 2]
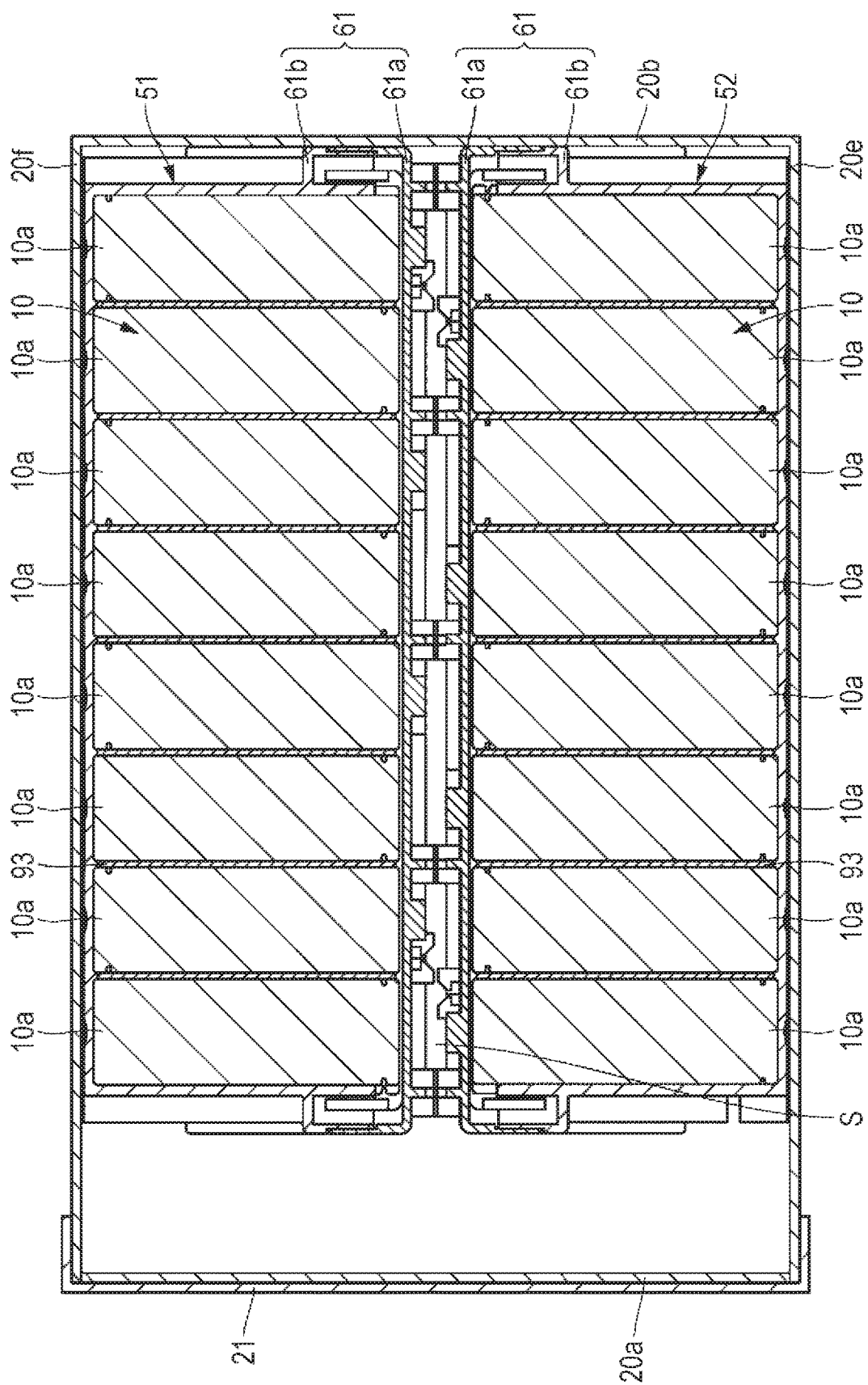

[Fig. 3]
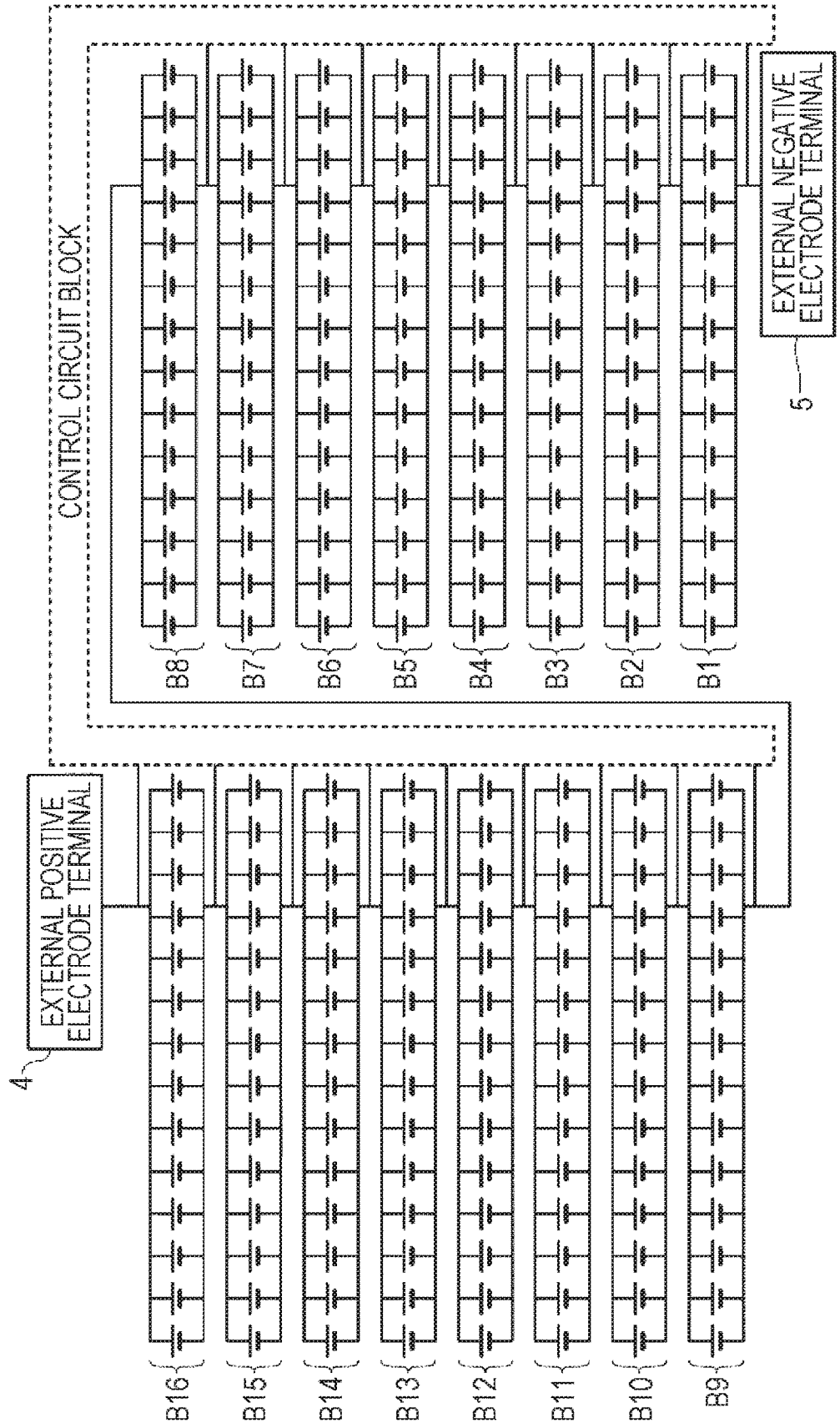

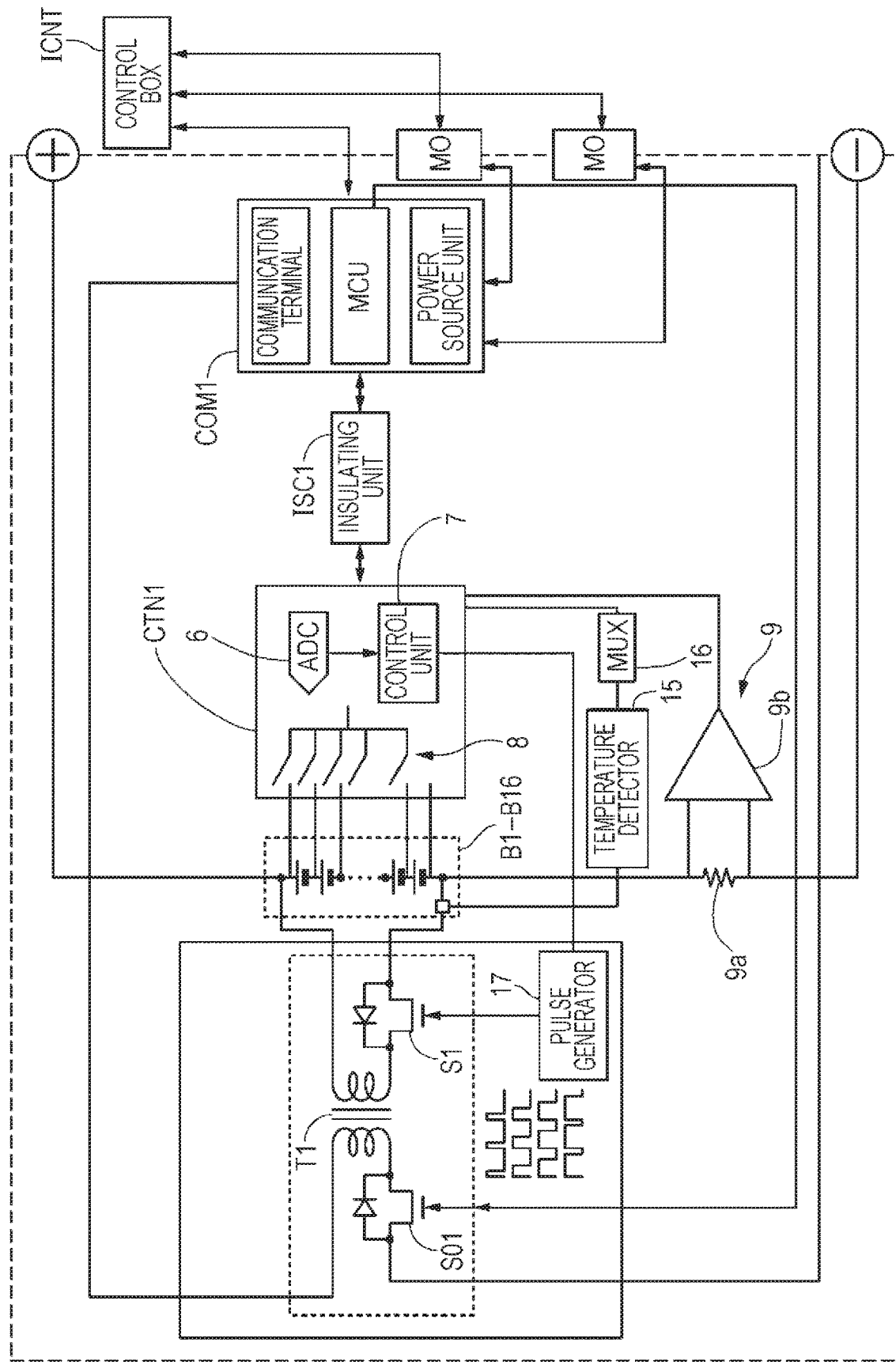
[Fig. 4]

[Fig. 5]
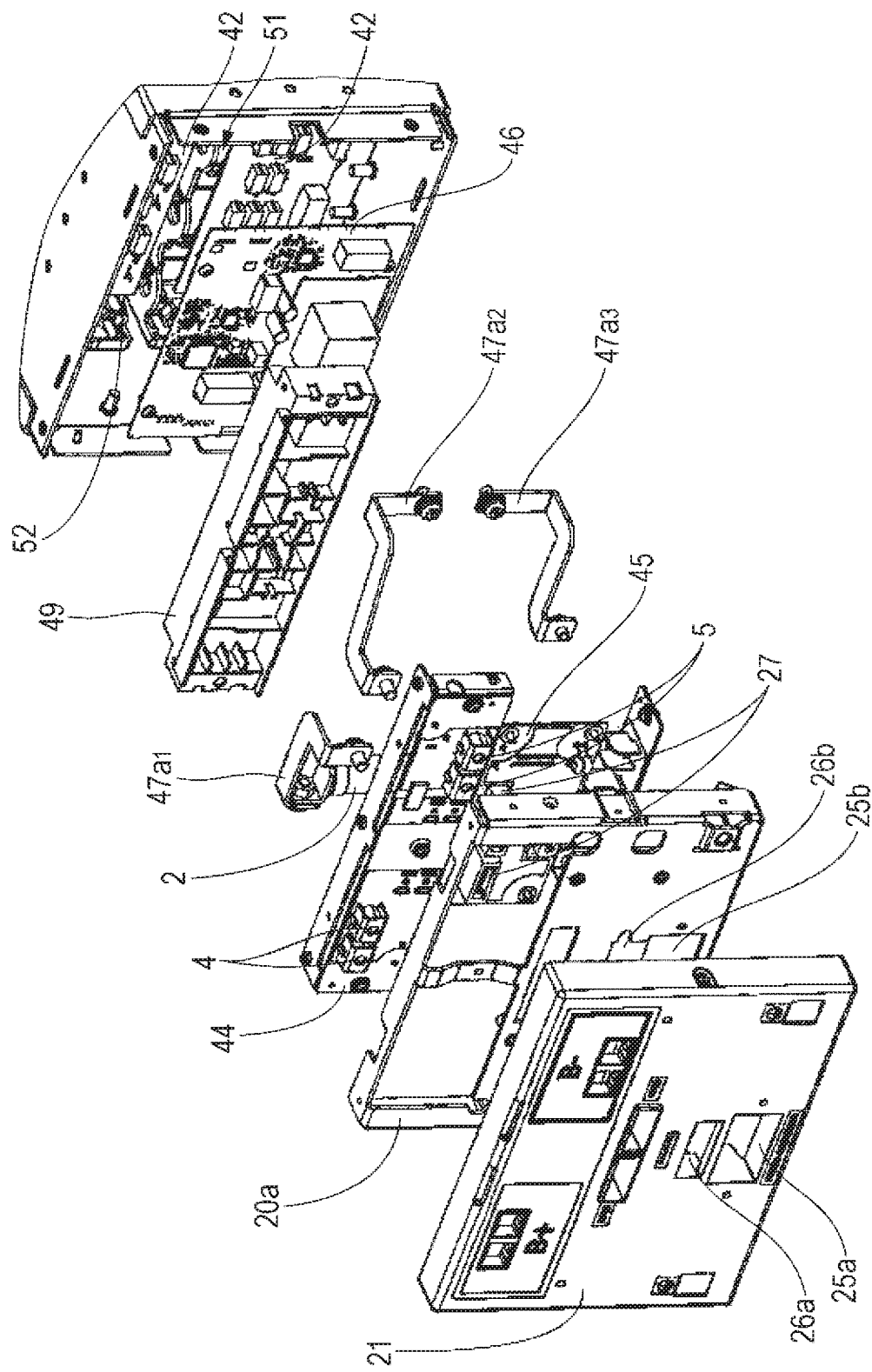

[Fig. 6]
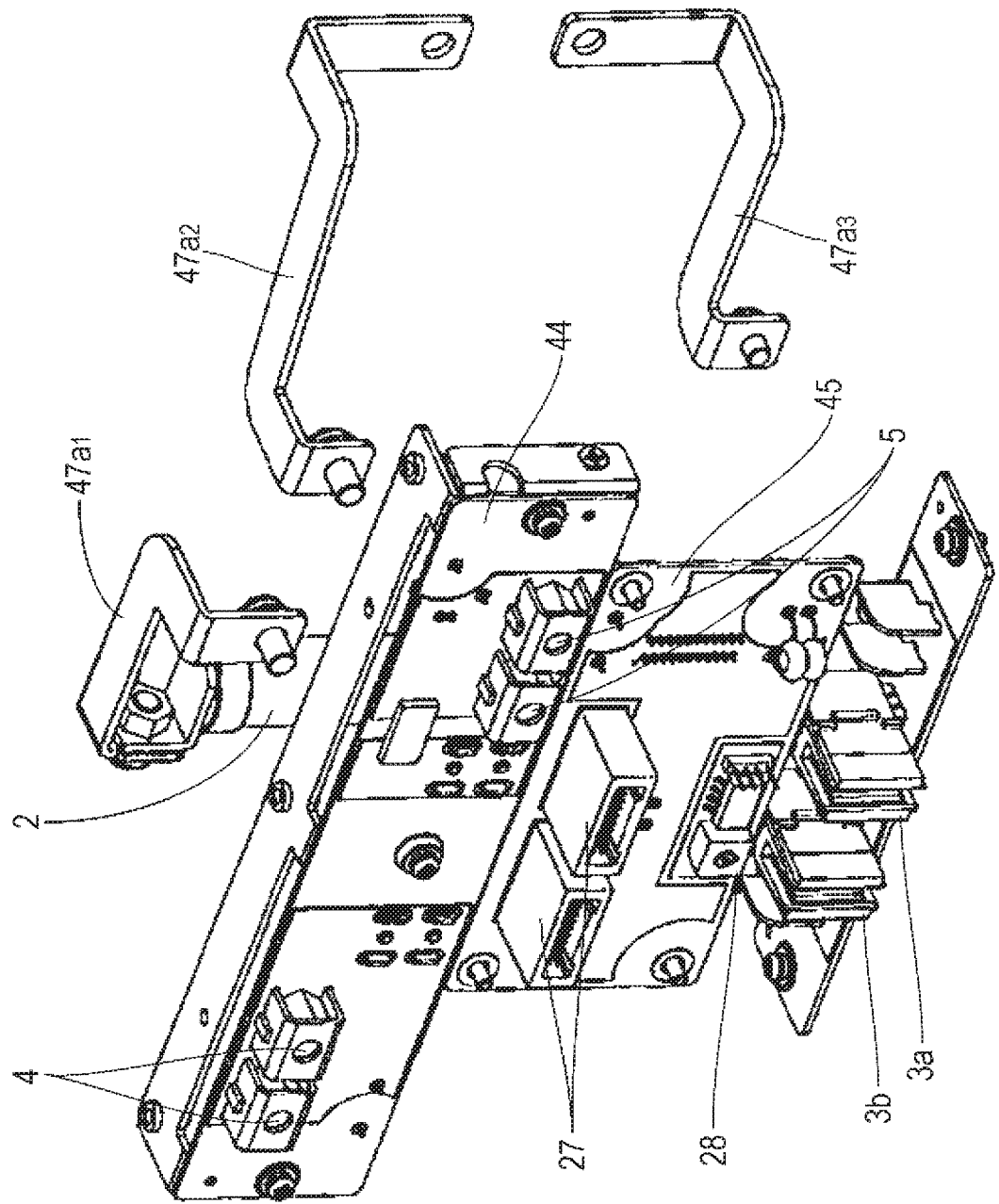

[Fig. 7]
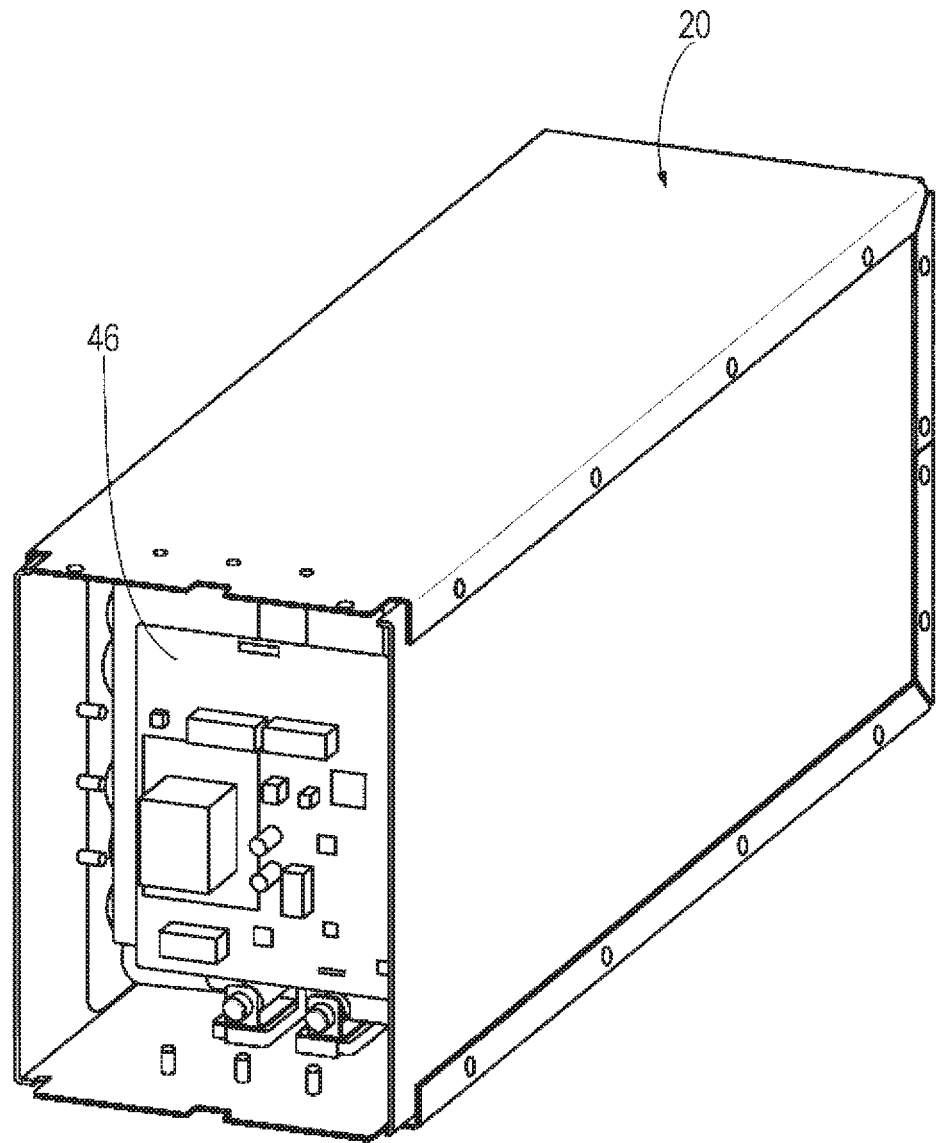

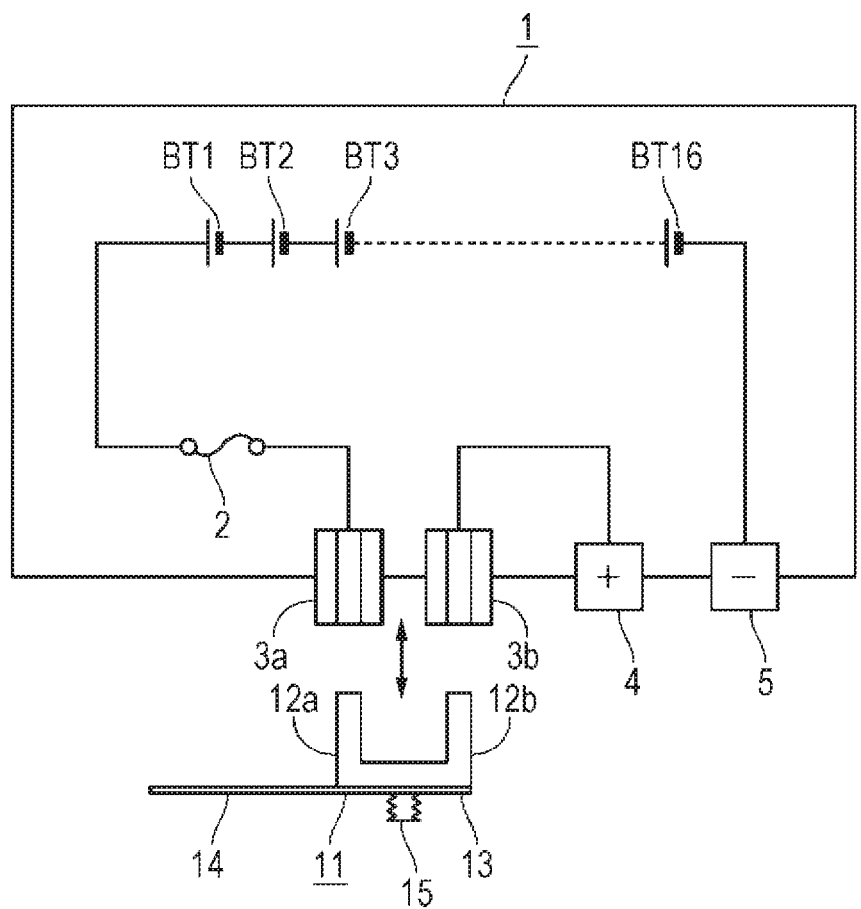
[Fig. 8]

[Fig. 9]
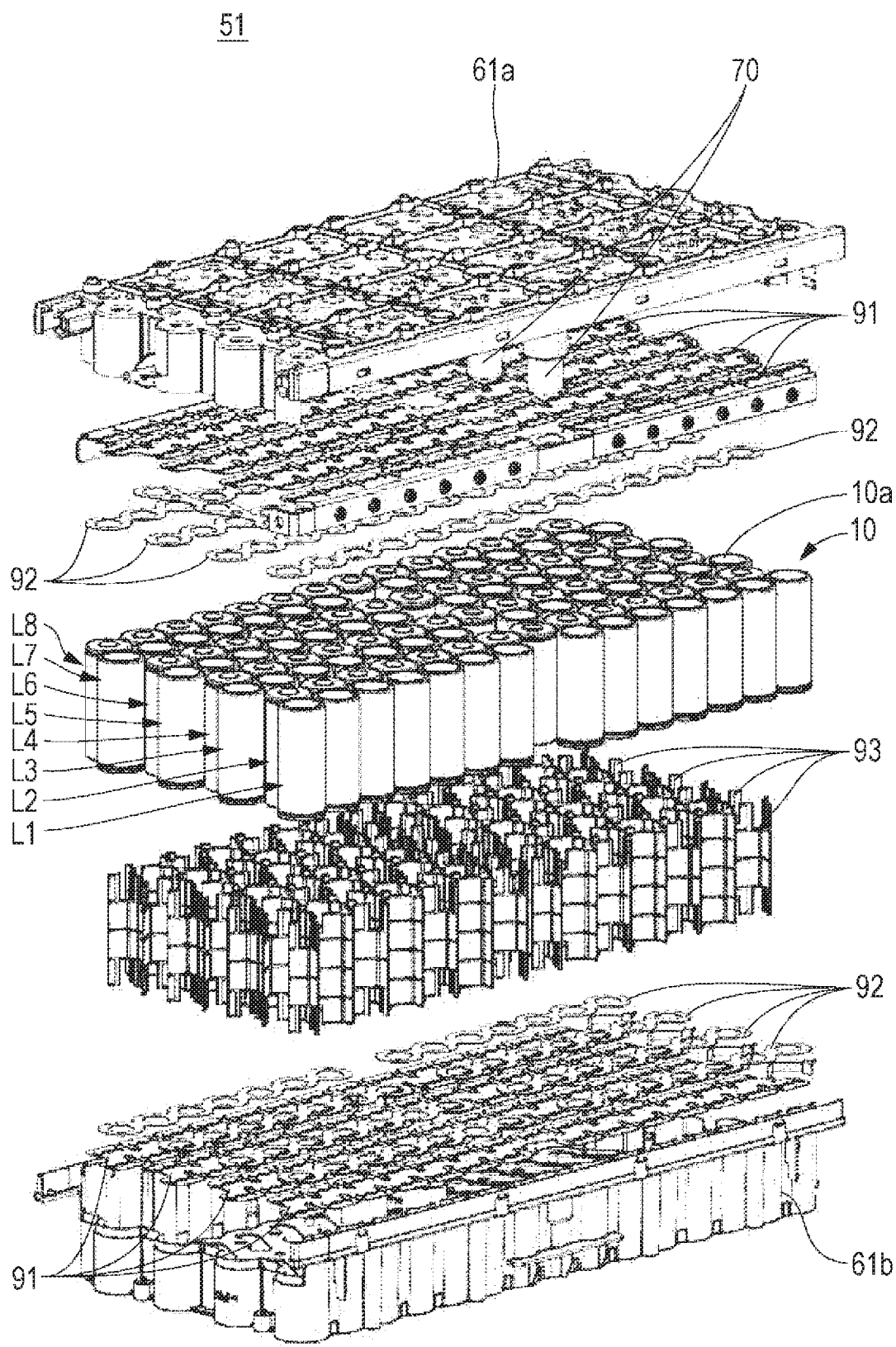

[Fig. 10]
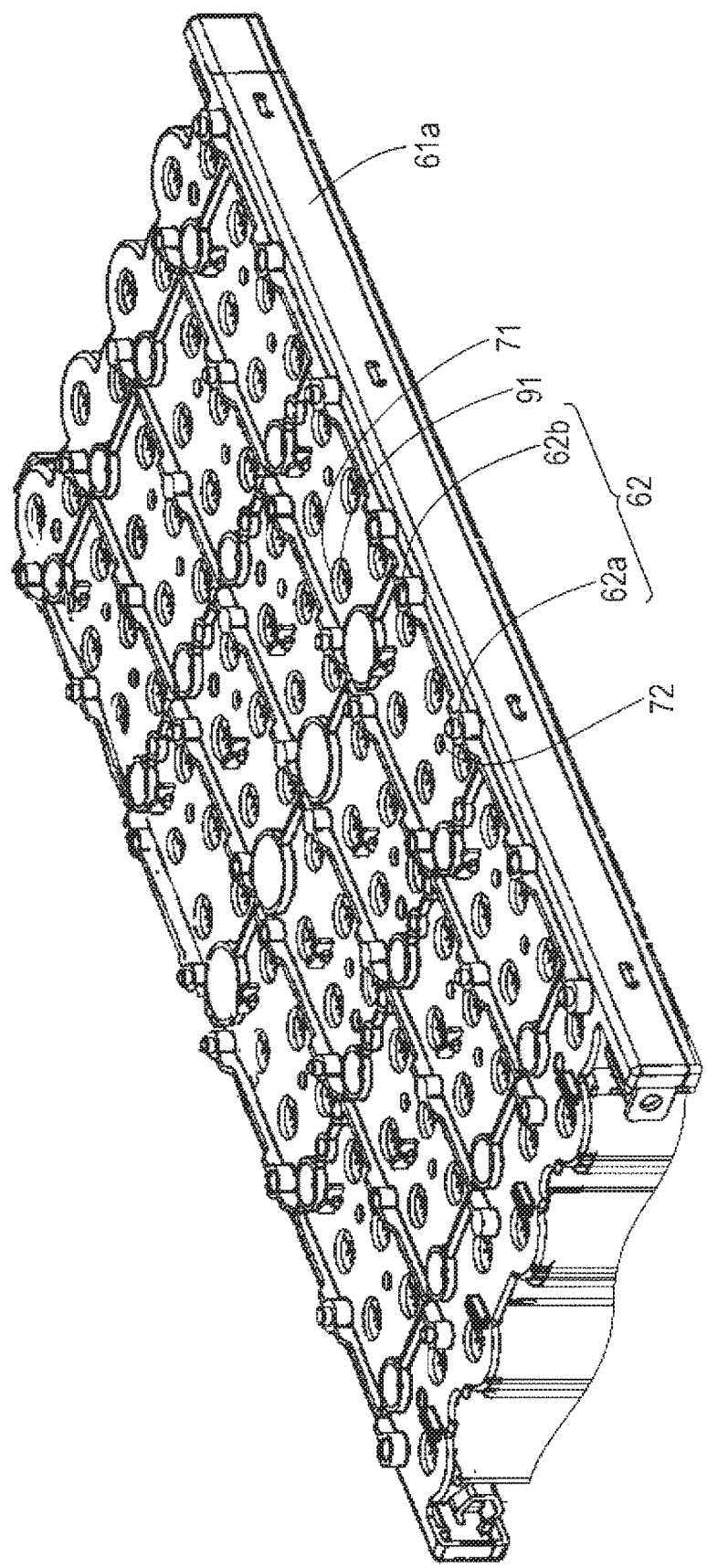

[Fig. 11]
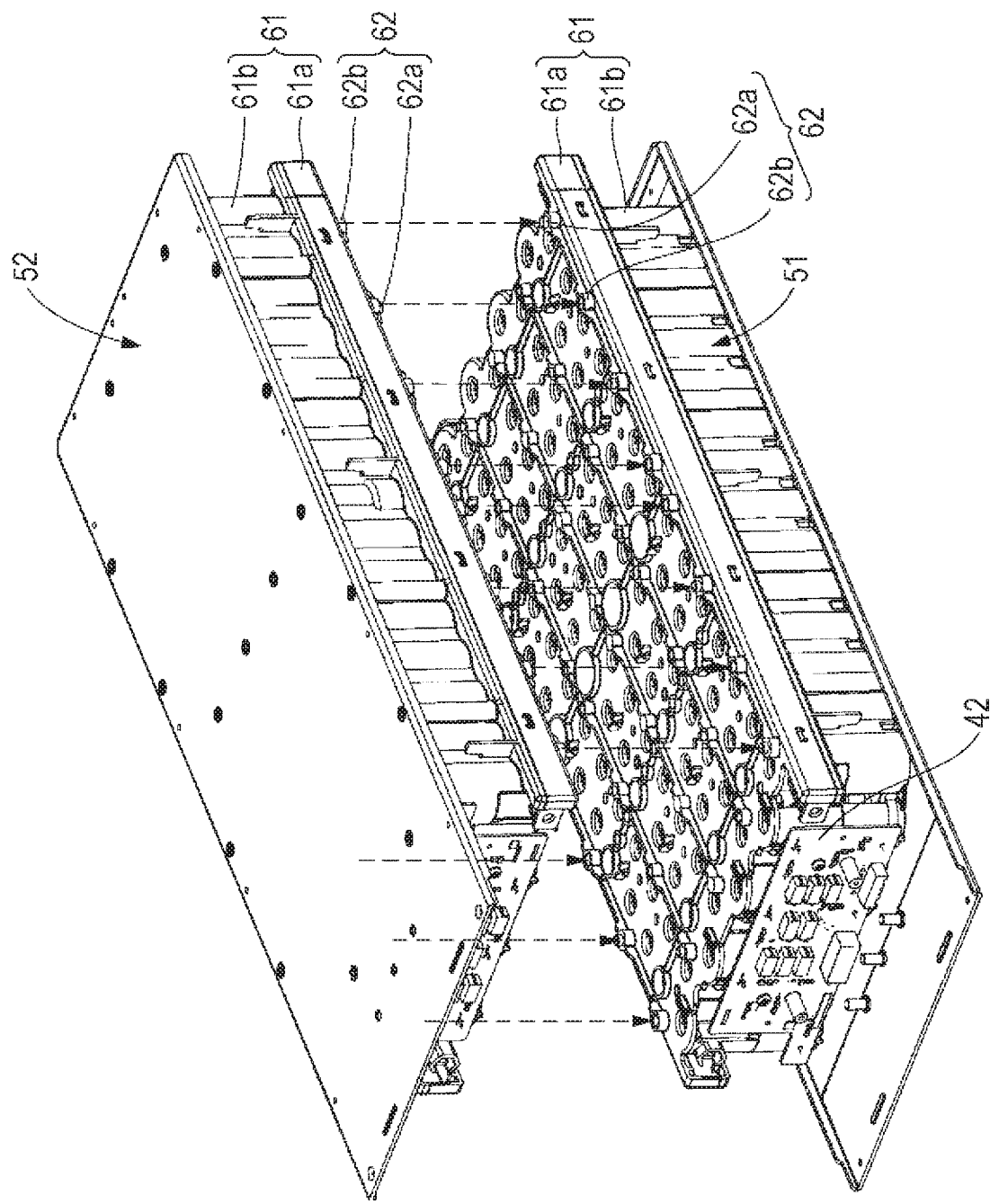

[Fig. 12]
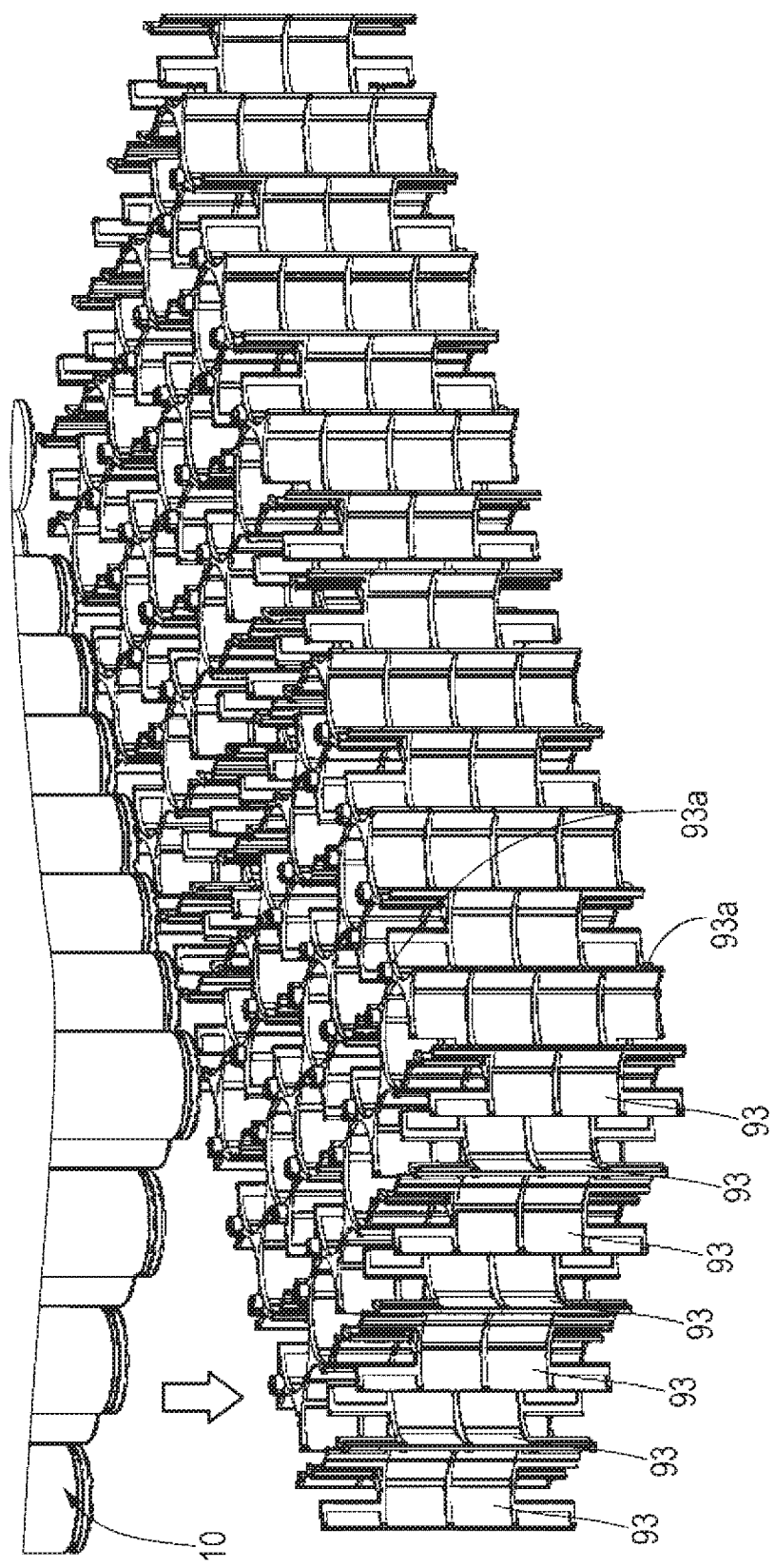

[Fig. 14]
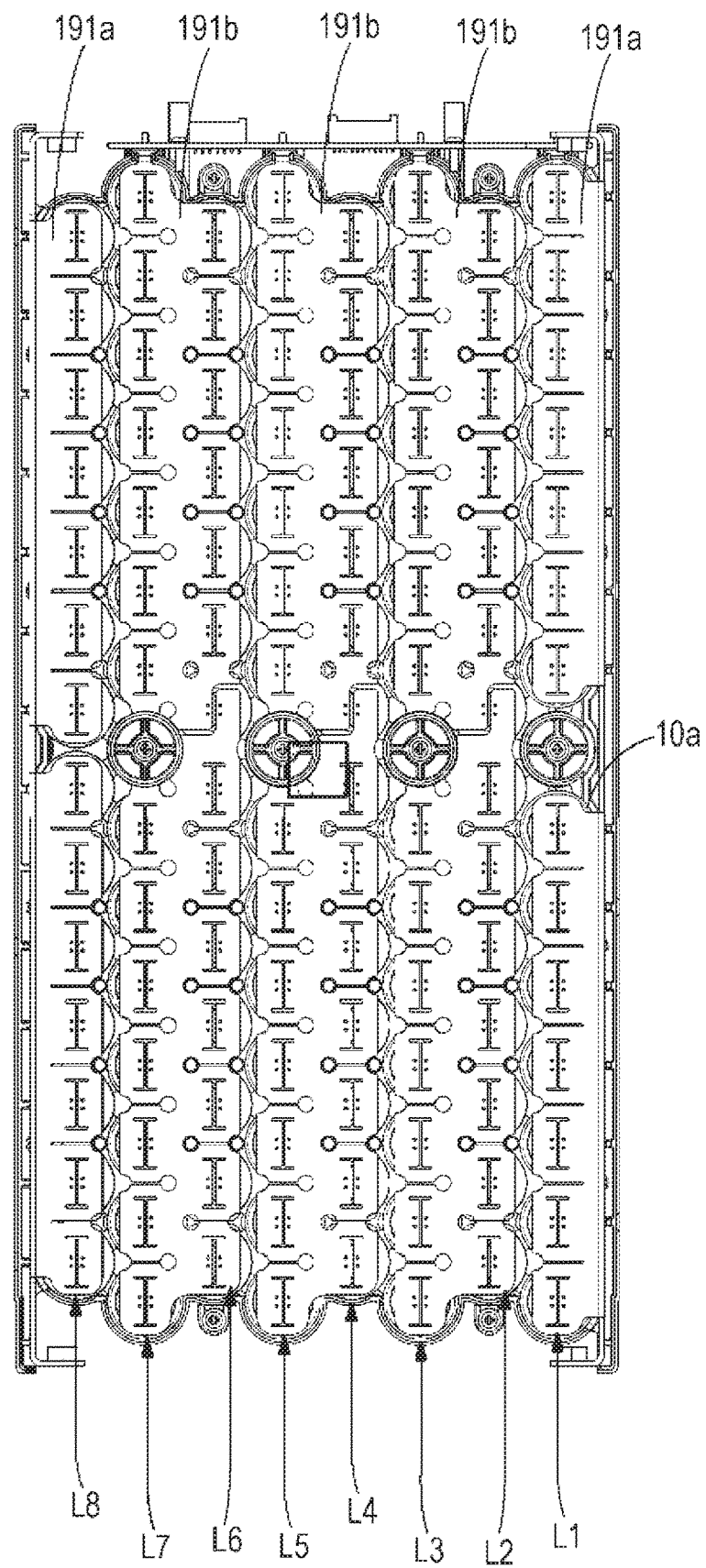

[Fig. 15]
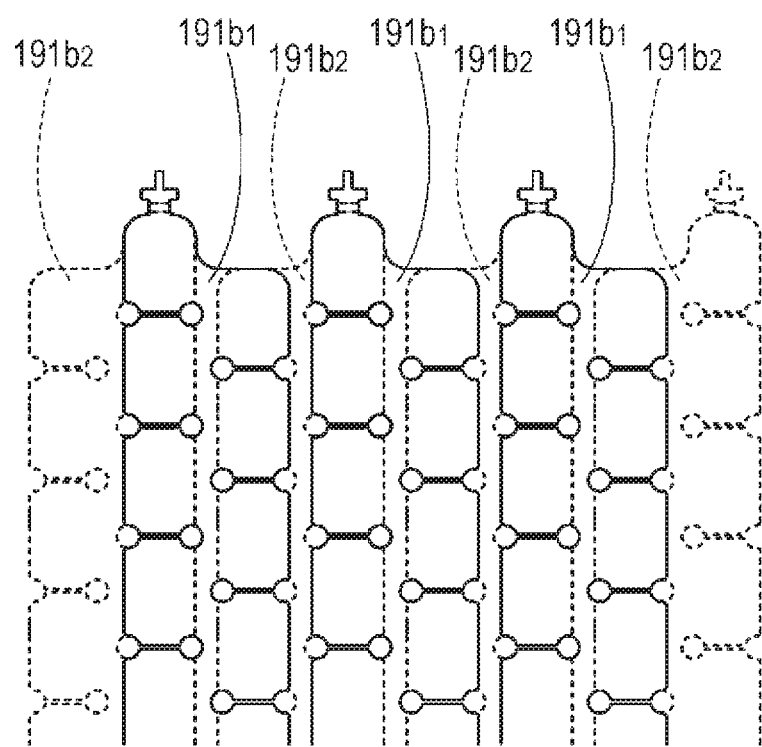

[Fig. 17]

[Fig. 18]
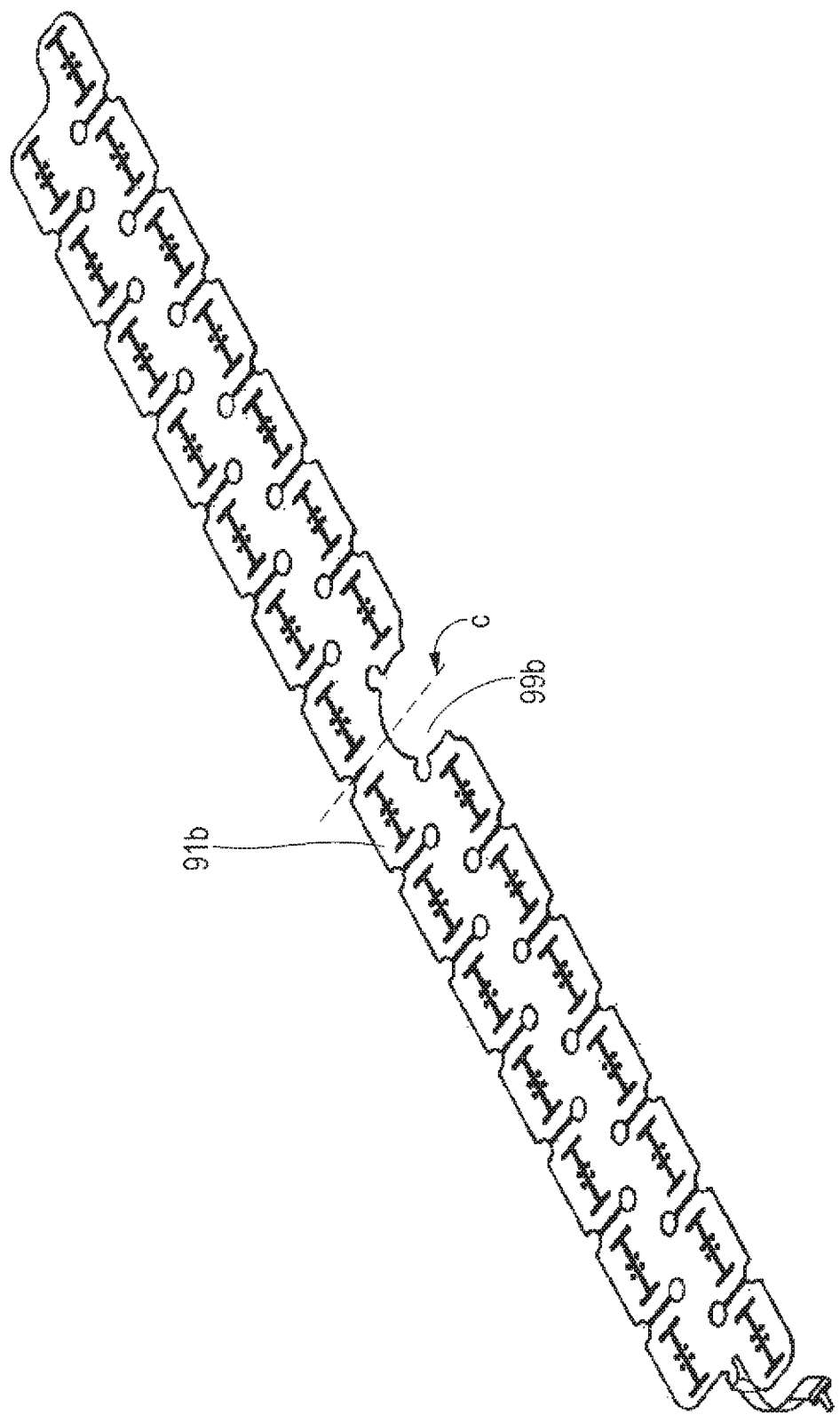

[Fig. 19]
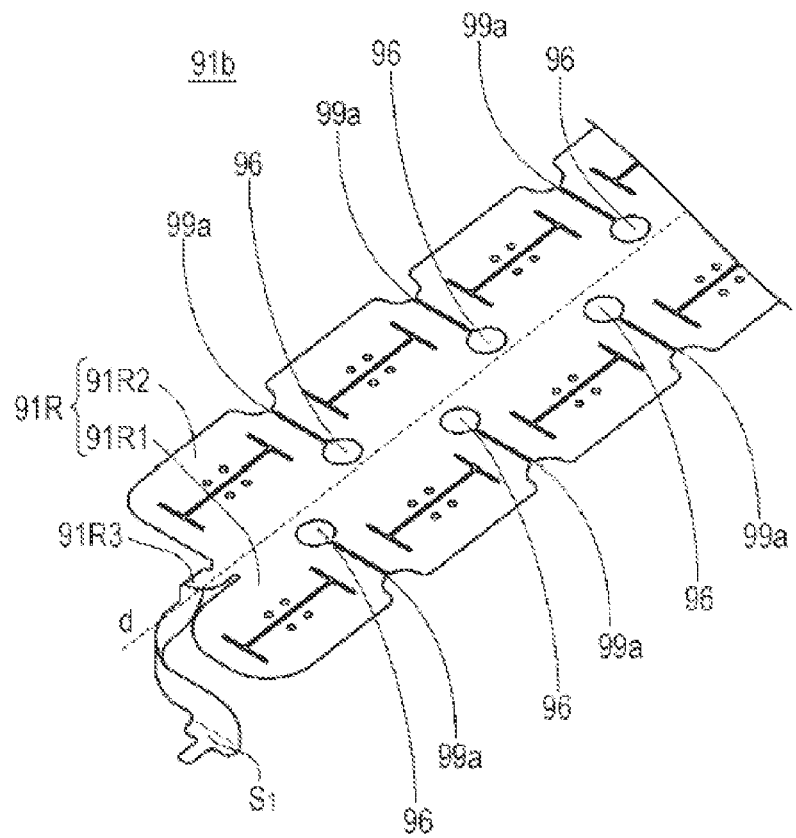
FIG. 19B
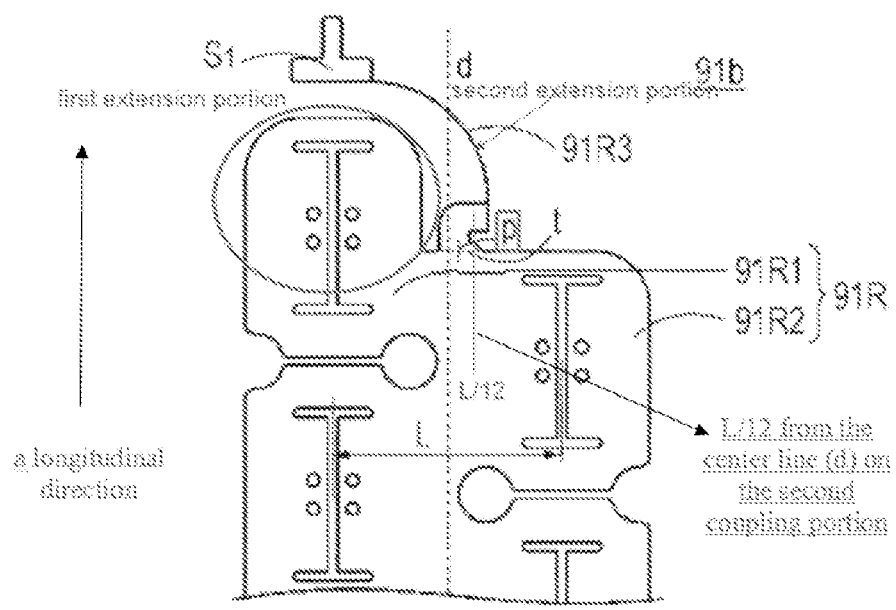

[Fig. 20]
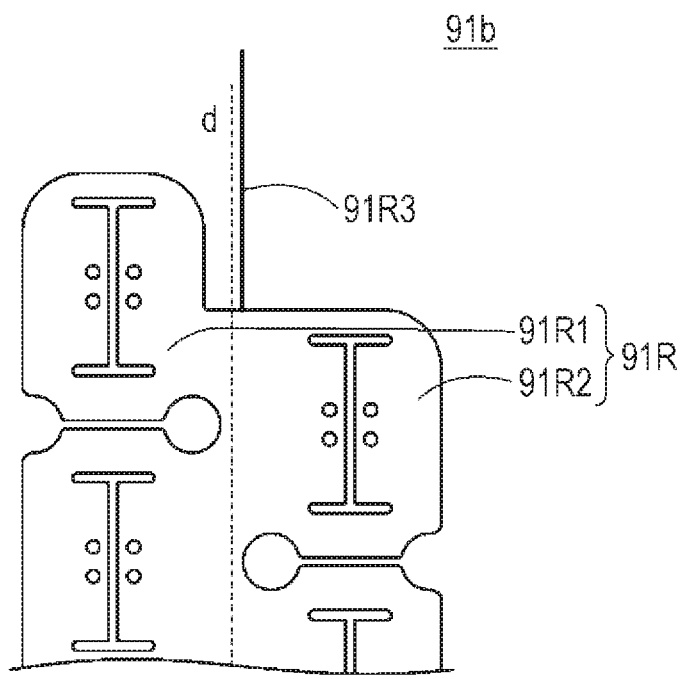

[Fig. 21]
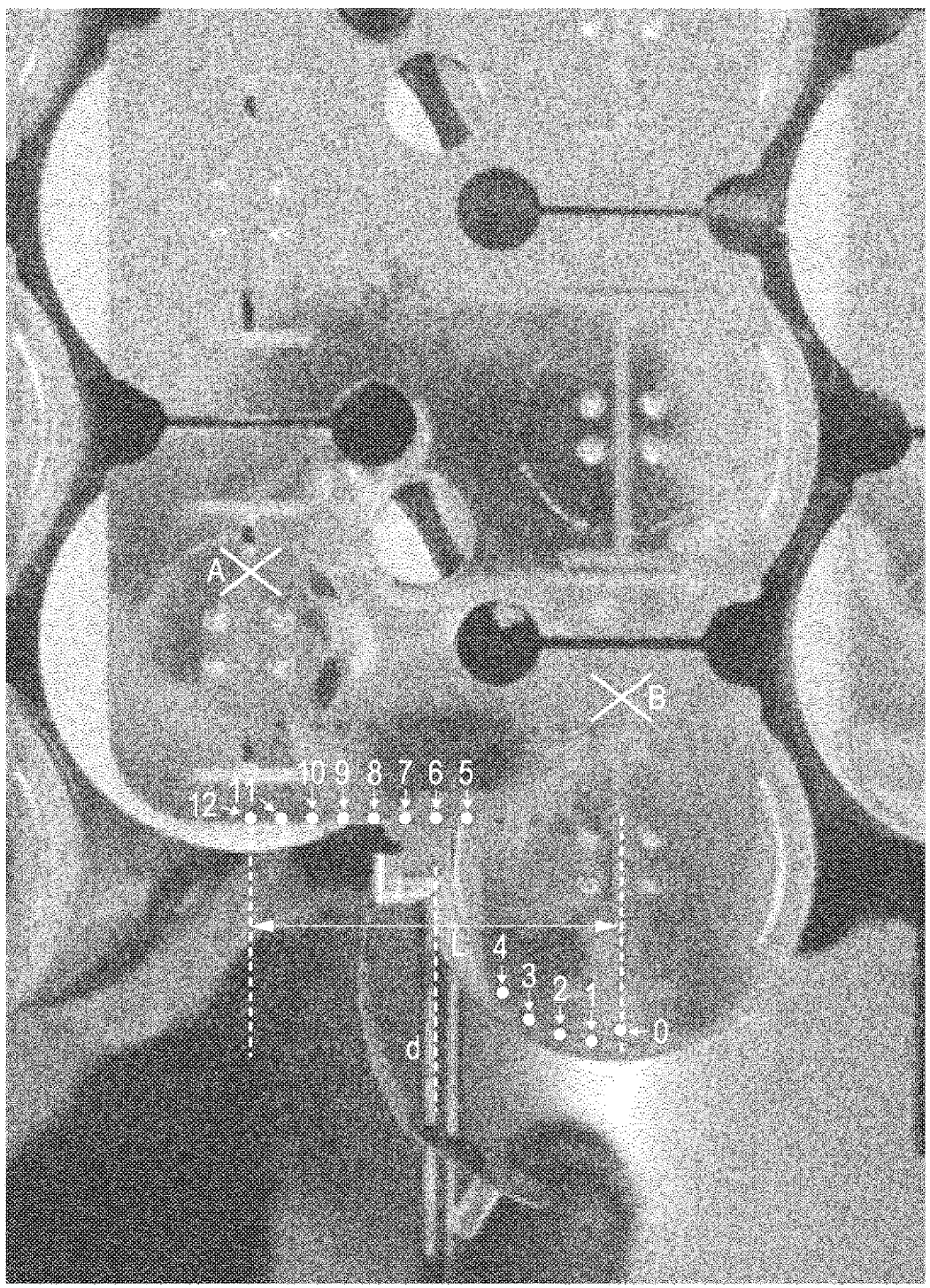

[Fig. 22]
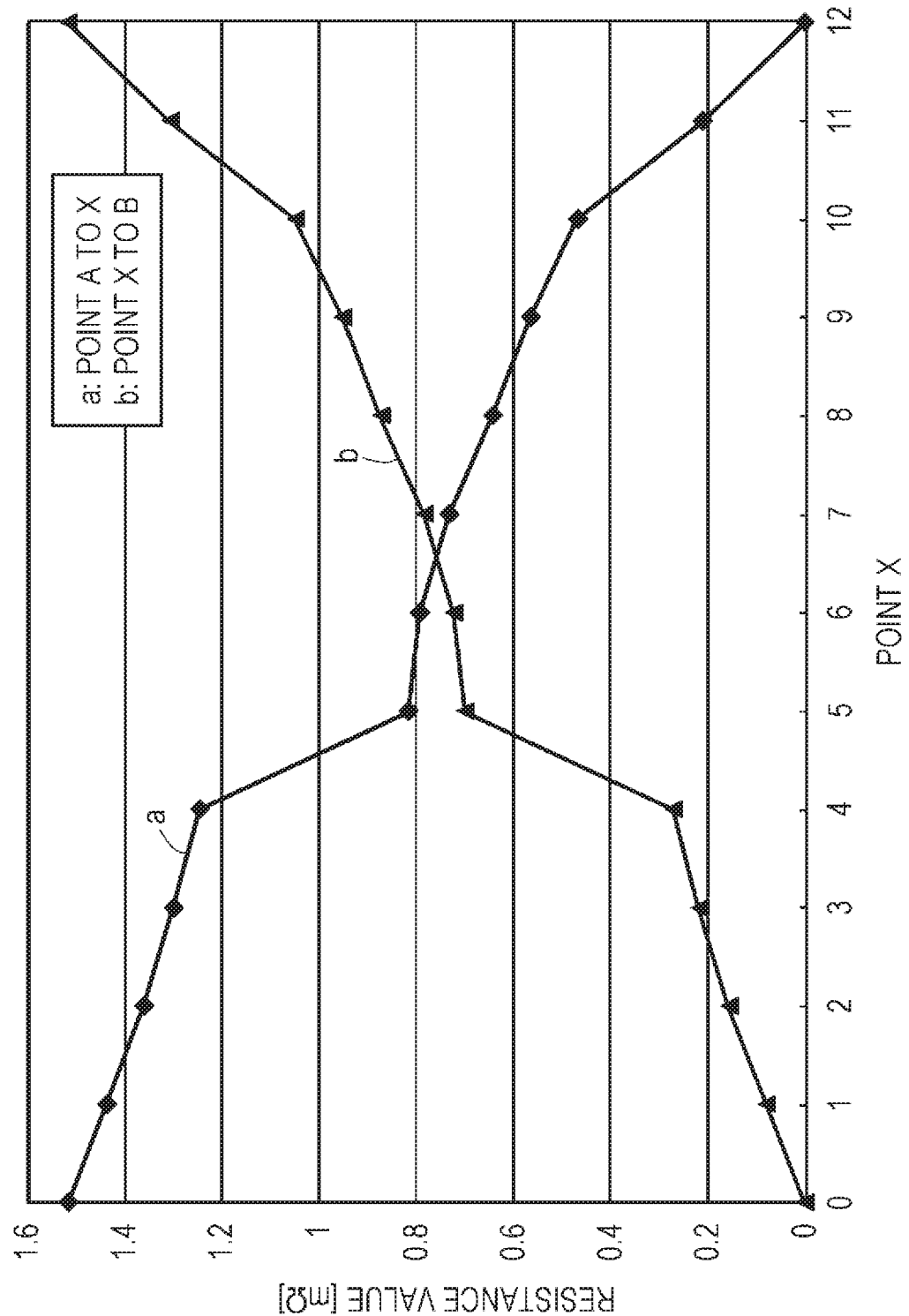

[Fig. 23]
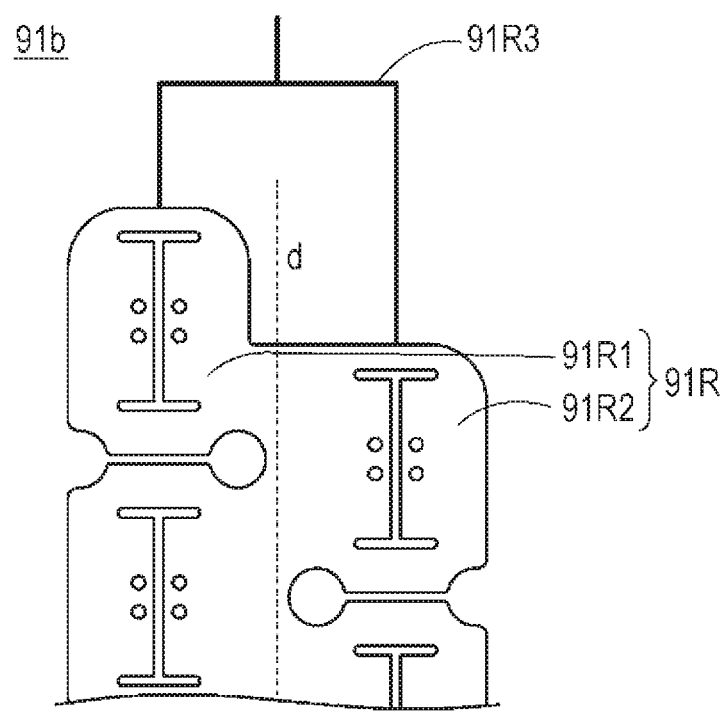

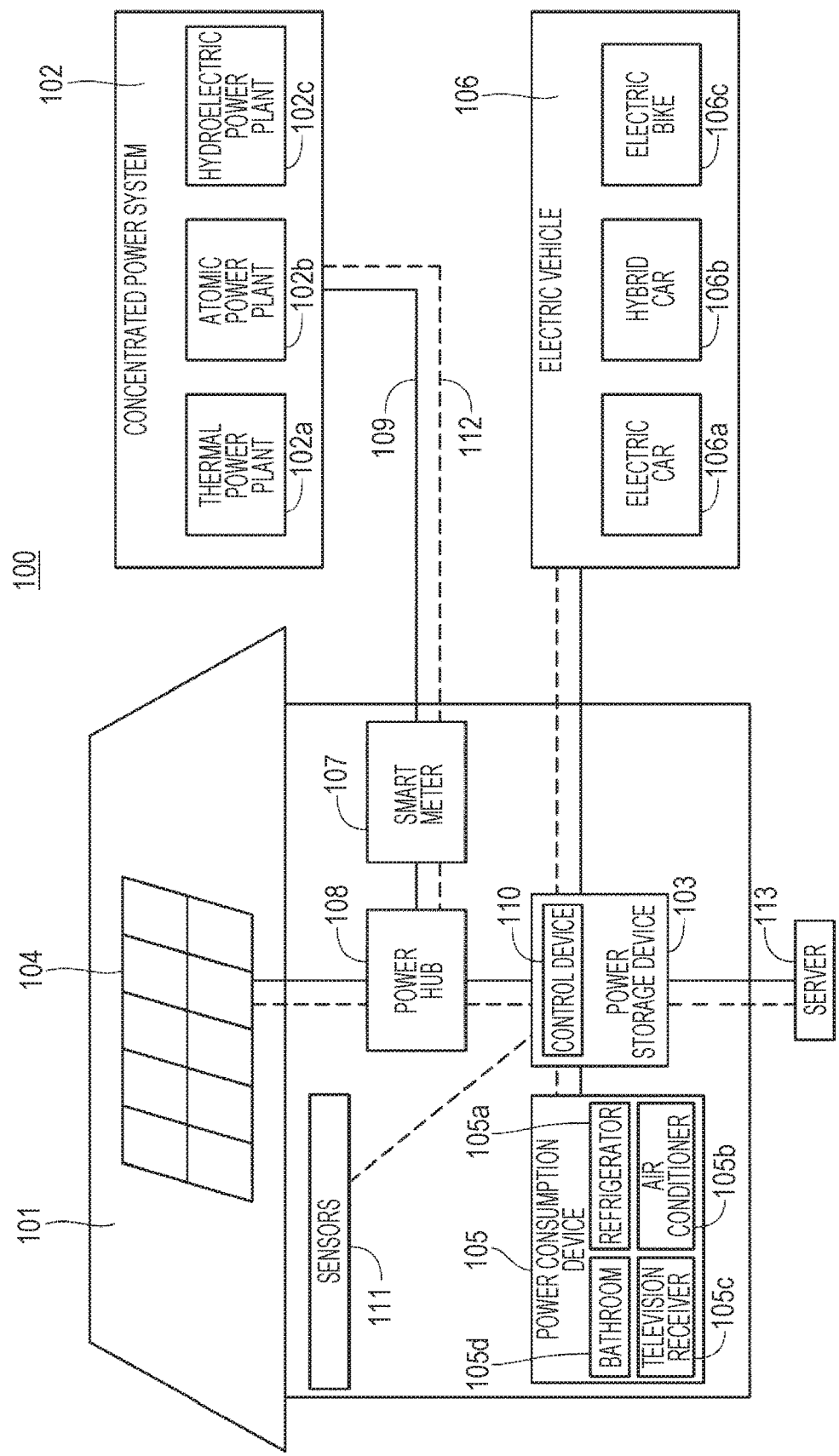
[Fig. 24]

[Fig. 25]
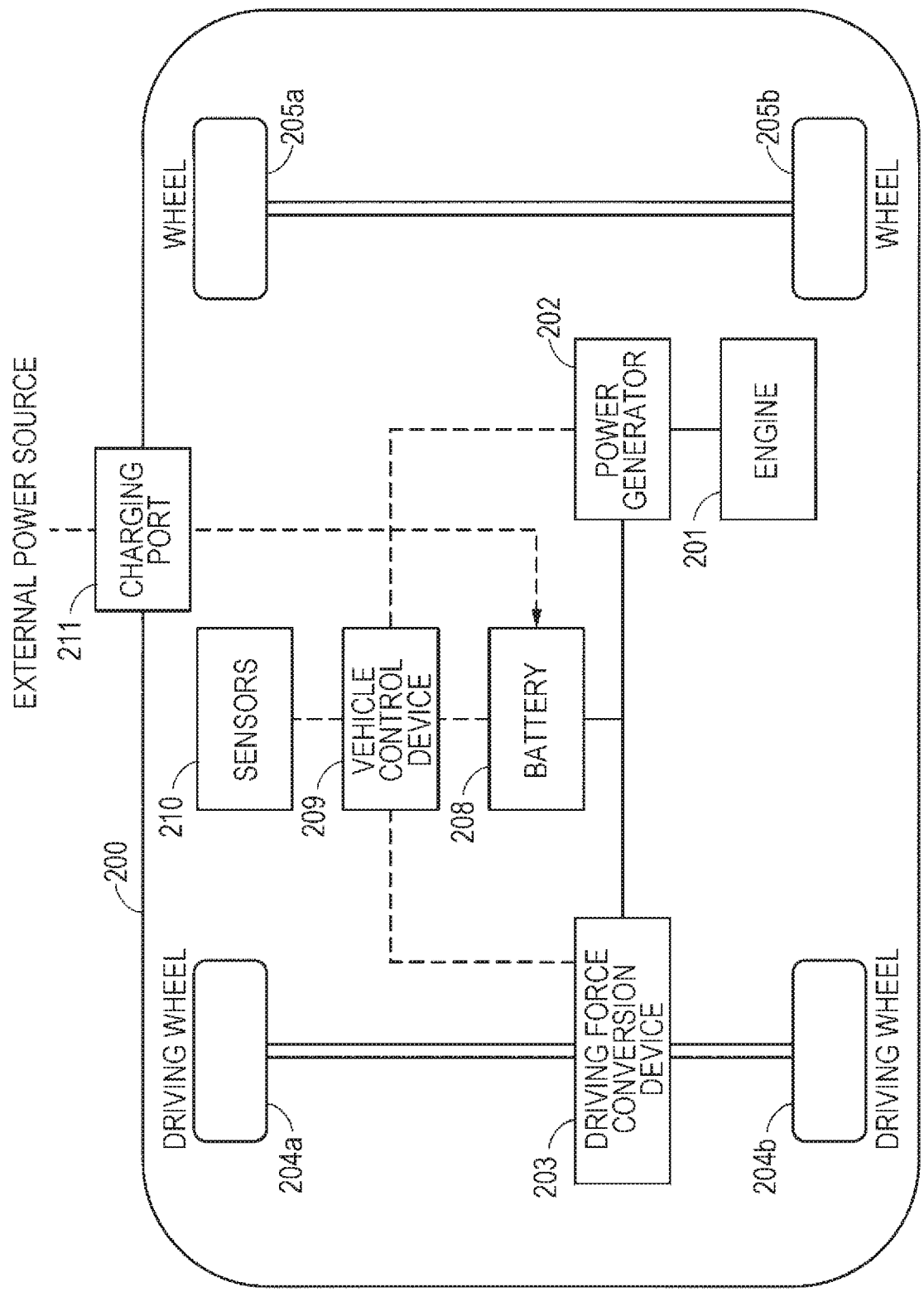

BATTERY PACK, POWER STORAGE DEVICE, POWER STORAGE SYSTEM, ELECTRONIC APPLIANCE, ELECTRIC VEHICLE, AND POWER SYSTEM

CROSS REFERENCE TO RELATED APPLICATIONS

The present application claims is a national stage of International Application PCT/JP2015/002426, filed May 13, 2015, which claims priority to Japanese Application No. 2014-105962, filed May 22, 2014, the entire contents of each of which are hereby incorporated herein by reference.

TECHNICAL FIELD

The present disclosure relates to a battery pack, a power storage device, a power storage system, an electronic appliance, an electric vehicle, and a power system.

BACKGROUND ART

In recent years, the application of secondary batteries such as lithium ion batteries have rapidly expanded and the batteries have come to be applied to, for example, storage batteries for automobiles or power storage devices for electric power accumulation combined with the new energy system, such as solar batteries or wind power generation. For generating high output, a battery system to which one or a plurality of power storage devices is connected is used. For example, a power storage device is formed by housing one or a plurality of battery blocks, which corresponds to a battery pack, in an exterior case. The battery block is formed by connecting a plurality of unit cells (also referred to as a single battery or a cell, and hereinafter called battery cell simply), which corresponds to an example of a power storage element.

PTLs 1 to 5 have disclosed techniques related to the power storage device including the battery pack.

CITATION LIST

Patent Literature

PTL 1: JP 2011-521403 T
PTL 2: JP 2008-541386 T
PTL 3: JP 2009-123371 A
PTL 4: JP 5030499 B
PTL 5: JP 2010-282811 A

SUMMARY

Technical Problem

In the battery pack, it is necessary to detect the voltage of a plurality of battery cells more accurately.

In view of the above, it has been desired to provide a battery pack, a power storage device, a power storage system, an electronic appliance, an electric vehicle, and a power system that can detect the voltage of a plurality of battery cells more accurately.

Solution to Problem

For solving the problem, the present technique provides a battery module comprising a battery group including a plurality of battery columns, the battery columns include at least a first battery column and a second battery column each including a plurality of battery cells; and a connection terminal portion coupled with terminal lanes of the battery cells, wherein the connection terminal portion includes a coupling portion including a first coupling portion configured to couple at least with the first battery column and a second coupling portion configured to couple at least with the second battery column adjacent to the first battery column, and an extension portion extended from an end of the coupling portion in a longitudinal direction, and when a horizontal distance between the first battery column and the second battery column is L and a center line between the first and second battery columns is set, a center of an extension starting end of the extension portion is between a first position of a horizontal distance $L/12$ on a first side of the first coupling portion from the center line and a second position of a horizontal distance $3L/12$ on a second side of the second coupling portion from the center line.

The present technique provides a battery module comprising: a battery group including a plurality of battery columns, the battery columns include at least a first battery column and a second battery column each including a plurality of battery cells; and a connection terminal portion coupled with terminal planes of the battery cells, wherein the connection terminal portion includes a coupling portion including a first coupling portion configured to couple at least with the first battery column and a second coupling portion configured to couple at least with the second battery column adjacent to the first battery column, and an extension portion obtained by connecting a first portion extended from a first end of the first coupling portion in a longitudinal direction and a second portion extended from a second end of the second coupling portion in a longitudinal direction.

The present technique provides a battery module comprising: a battery group including a plurality of battery columns, the battery columns include at least a first battery column and a second battery column each including a plurality of battery cells; and a connection terminal portion coupled with terminal planes of the battery cells, wherein the connection terminal portion includes a coupling portion including a first coupling portion configured to couple at least with the first battery column and a second coupling portion configured to couple at least with the second battery column adjacent to the first battery column, and an extension portion connected to the connection terminal portion, wherein the extension portion is at a position to allow measurement of a first resistance value between the position and the first coupling portion and a second resistance value between the position and the second coupling portion, and wherein a resistance value difference between the first and second resistance values is 0.4 or less.

The present technique provides a connection terminal portion for a battery module comprising: a coupling portion including a first coupling portion configured to couple at least with a first battery column and a second coupling portion configured to couple at least with a second battery column adjacent to the first battery column, and an extension portion extended from an end of the coupling portion in a longitudinal direction, and when a horizontal distance between the first battery column and the second battery column is L and a center line between the first and second battery columns is set, a center of an extension starting end of the extension portion is between a first position of a horizontal distance $L/12$ on a first side of the first coupling portion from the center line and a second position of a horizontal distance $3L/12$ on a second side of the second coupling portion from the center line.

A power storage device, a power storage system, an electronic appliance, an electric vehicle, and a power system according to an embodiment of the present technique include the aforementioned battery pack.

Advantageous Effects of Invention

According to an embodiment of the present technique, the voltage of a plurality of battery cells can be detected more accurately.

BRIEF DESCRIPTION OF DRAWINGS

FIG. 1 is a perspective diagram illustrating an external appearance of a power storage device.

FIG. 2 is a schematic sectional diagram taken along a line A-A' of FIG. 1.

FIG. 3 is a block diagram schematically illustrating an electric structure of a power storage device according to a first embodiment of the present technique.

FIG. 4 is a block diagram illustrating an example of the electric structure of the power storage device according to the first embodiment of the present technique.

FIG. 5 is an exploded perspective diagram illustrating a front end portion of a power storage device.

FIG. 6 is a perspective diagram illustrating a member that is removed with a front plane portion.

FIG. 7 is a perspective diagram illustrating the state in which the front plane portion has been removed.

FIG. 8 is a block diagram schematically illustrating the electric structure of the power storage device according to the first embodiment of the present technique.

FIG. 9 is an exploded perspective diagram illustrating a structure example of a battery unit.

FIG. 10 is a perspective diagram illustrating a structure example of a top case.

FIG. 11 is a perspective diagram illustrating the state before two battery units are combined.

FIG. 12 is a schematic perspective diagram illustrating a structure of the partition plate and a state before the partition plate and the battery block group are combined.

FIG. 14 is a plan diagram of the power storage device including the typical connection terminal portion, which is different from that of the present technique.

FIG. 15 is a schematic diagram illustrating the arrangement of the connection terminal portion on the top plane side and the connection terminal portion on the bottom plane side, which are obtained by viewing FIG. 14 from the top plane side.

FIG. 18 is a perspective diagram illustrating a structure example of the entire connection terminal portion.

FIG. 19A is a perspective diagram illustrating a part of the connection terminal portion. FIG. 19B is a plan diagram illustrating a part of the connection terminal portion.

FIG. 20 is a plan diagram illustrating a modified example of the connection terminal portion.

FIG. 21 is a photograph of a structure of the connection terminal portion and the like used in the test example.

FIG. 22 is a graph of the measurement results from the test example.

FIG. 23 is a plan diagram illustrating a structure example of a connection terminal portion used in a power storage device according to a second embodiment.

FIG. 24 is a block diagram for describing an application example of the power storage device according to an embodiment of the present technique.

FIG. 25 is a block diagram for describing an application example of the power storage device according to an embodiment of the present technique.

DESCRIPTION OF EMBODIMENTS

Figure 13A:
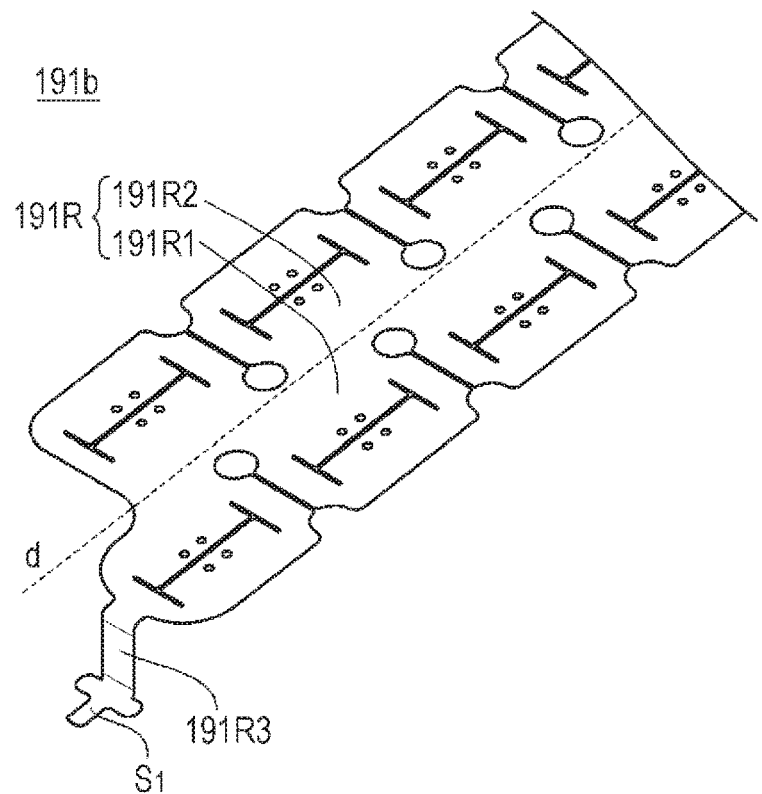
FIG. 13A is a perspective diagram illustrating a part of the connection terminal portion having a structure different from that of the present technique.

Embodiments of the present technique are described below with reference to the drawings. The description is made in the following order. Throughout the drawings, the same or corresponding portions are denoted by the same reference numeral.

1. First Embodiment (an example of power storage device)
2. Second Embodiment (another example of power storage device)
3. Another embodiment (modified example)
4. Application example Note that the embodiments and the like described below are the preferable specific examples of the present technique and the content of the present technique is not limited to the embodiments and the like. Moreover, the effect described in this specification is just the example and the effect different from the effect herein described may be obtained.

1. First Embodiment

Structure Example of Power Storage Device

A structure example of a power storage device according to a first embodiment of the present technique is described with reference to drawings. FIG. 1 is a perspective diagram illustrating an external appearance of a power storage device. FIG. 2 is a sectional diagram taken along a line A-A' of FIG. 1. Note that in FIG. 2, the components other than an exterior case, a battery case, a battery cell, and a partition plate are not illustrated. FIG. 3 schematically illustrates an electric structure of a power storage device according to the first embodiment of the present technique. FIG. 4 schematically illustrates the electric structure of the power storage device according to the first embodiment of the present technique.

As illustrated in FIG. 1, a power storage device 1 includes an exterior case 20. The exterior case 20 is an approximately rectangular parallelepiped with a front plane portion 20a, a rear plane portion 20b, a top plane portion 20c, a bottom plane portion 20d, and two side plane portions 20e and 20f. As the material of the exterior case 20, a material with high thermal conductivity and a high radiation rate is preferable. In other words, for the front plane portion 20a, the rear plane portion 20b, the top plane portion 20c, the bottom plane portion 20d, and the two side plane portions 20e and 20f, the material with the high thermal conductivity and the high radiation rate is preferably used. This enables the case to have high heat release property and can suppress the temperature increase inside the exterior case 20. For example, each of the front plane portion 20a, the rear plane portion 20b, the top plane portion 20c, the bottom plane portion 20d, and the two side plane portions 20e and 20f of the exterior case 20 has a plate-like shape or a shape obtained by processing a plate-like shape. The plate-like body is, for example, a metal plate of aluminum, aluminum alloy, copper, copper alloy, or the like.

The front plane portion 20a of the case is covered with a protective cover 21. The protective cover 21 is formed of, for example, an insulating material such as resin. By covering the front plane portion 20a with the protective cover 21 formed of the insulating material, for example, the front plane portion 20a can be surely insulated from the connection member that electrically connects between the plural power storage devices 1, such as a bus bar. Note that the power storage device 1 can be placed with the plane other than the front plane portion 20a facing downward. In other words, the power storage device 1 can be placed with the rear plane portion 20b, the top plane portion 20c, the bottom plane portion 20d, the side plane portion 20e, or the side plane portion 20f facing downward.

As illustrated in FIG. 2, a battery unit 51, a battery unit 52, and a board with a control circuit block, etc. mounted thereon (not illustrated in FIG. 2) are housed in the exterior case 20 of the power storage device 1. Each of the battery unit 51 and the battery unit 52 is obtained by arranging components such as a battery block group 10, which is a battery pack including a plurality of battery cells 10a, a partition plate 93 inserted between the columns of the battery cells 10a arranged in the columnar shape, and a connection terminal portion 91 (not shown in FIG. 2) that electrically connects between the battery cells 10a in a battery case 61 including a top case 61a and a bottom case 61b.

The side plane portion 20e of the exterior case 20 on the front side and the side plane portion 20f thereof on the rear side are, for example, rectangular plate-like bodies. The battery unit 51 is fixed on the side plane portion 20f and the battery unit 52 is fixed on the side plane portion 20e. Although not shown, for example, the battery unit 51 is fixed to the side plane portion 20f by having a plurality of convex engagement parts of the side plane portion 20f fitted to a plurality of hole-like engagement parts of the bottom plane portion of the bottom case 61b. Moreover, the battery unit 52 is fixed to the side plane portion 20e by having a plurality of convex engagement parts of the side plane portion 20e fitted to a plurality of hole-like engagement parts of the bottom plane portion of the bottom case 61b.

The battery block group 10 includes, for example, a plurality of battery blocks connected in series, and one battery block includes a plurality of battery cells 10a connected in parallel. The battery cell 10a is, for example, a secondary battery such as a cylindrical lithium ion secondary battery. Note that the battery cell 10a is not limited to the lithium ion secondary battery.

For example, the battery unit 51 and the battery unit 52 are housed in the exterior case 20 while being two-stage stacked horizontally in the state that the bottom plane portion and the top plane portion of the battery case 61 face in a horizontal direction. A space S is provided between the surfaces of the battery unit 51 and the battery unit 52 that face each other, which is specifically described below.

As illustrated in FIG. 3, for example, in the battery unit 51 and the battery unit 52, battery blocks B1 to B16 each including 14 battery cells 10a connected in parallel to each other are housed while being connected in series. The battery unit 51 houses the battery block group 10 including the battery blocks B1 to B8, and the battery unit 52 houses the battery block group 10 including the battery blocks B9 to B16. Note that the number of battery cells 10a included in each battery block is not limited to 14 and the number of battery blocks included in the battery block group 10 is not limited to the above number.

In the battery unit 51 and the battery unit 52, the connection terminal portion 91 formed of the electrically conductive material for connection is used for connecting between the battery cells 10a or between the battery cells 10a and the adjacent battery blocks in series and/or in parallel. The connection terminal portion 91 is a plate-shaped body formed of the electrically conductive material such as metal.

Each of the battery blocks B1 to B16 is connected to the control circuit block (hereinafter called control block), and the charging and discharging are controlled thereby. The charging and discharging are conducted through an external positive electrode terminal 4 and an external negative electrode terminal 5. For example, one power storage device 1 outputs (16*3.2 V=51.2 V).

For monitoring the voltage, current, and temperature of the battery cell 10a, the control block is provided in the power storage device 1. The information from the control block is transmitted to the external controller through the communication. The external controller conducts the management for the charging, the discharging, and the deterioration suppression. For example, the control block monitors the voltage of each battery block, converts the detected voltage into digital signals, and transmits the signals to a control box ICNT, which is the external controller. In addition to the voltage, the temperature of each battery block may be detected, the temperature may be converted into digital data, and the data may be transmitted to the control box ICNT.

FIG. 4 illustrates an example of the control block. As illustrated in FIG. 4, the voltage at opposite ends of the 16 battery blocks B1 to B16 connected in series and the voltage of each battery block are detected. A multiplexer 8 (MUX 8) for sequentially outputting the voltage at opposite ends of the battery blocks B1 to B16 connected in series and the voltage of each battery block is provided.

The MUX 8 selects one piece of analog voltage data from among n pieces of analog voltage data by switching channels in response to a predetermined control signal. The one piece of analog voltage data selected by the MUX 8 is supplied to an A/D converter (ADC (Analog to Digital Converter) 6).

The ADC 6 converts the analog voltage data supplied from the MUX 8 into digital voltage data. For example, the analog voltage data are converted into the digital voltage data of 14 to 18 bits. The digital voltage data from the ADC 6 are supplied to a communication unit COM1. The communication unit COM1 is controlled by the control unit 7 to communicate with an external device to be connected through a communication terminal. For example, the communication is made with another power storage device MO through the communication terminal and with the control box ICNT through the communication terminal. Moreover, the control signal is received from the control box ICNT through the communication terminal. Thus, the communication unit COM1 conducts the bidirectional communication.

Moreover, the control unit 7 controls to homogenize the voltages of the battery blocks B1 to B16. Such control is referred to as cell balance control. For example, if the discharge voltage of one battery block among the battery blocks B1 to B16 has reached the lower limit, the other battery blocks still have a capacity left. In the next charging, the other battery blocks having the capacity left reach the charge upper-limit voltage sooner and therefore it is difficult to obtain the fully-charged state. For avoiding such unbalance, the MOSFET (Metal Oxide Semiconductor Field Effect Transistor) is turned on so that the battery block having the capacity left is forcibly discharged. Note that the type of the cell balance control is not limited to the passive type as described above and may be so-called active type or other various types.

A pulse generator 17 generates control pulses for a switch (MOSFET) S1 on the primary side of a flyback transformer T1 of a module balance control circuit, which controls the voltage balance between the power storage device 1 and the plural power storage devices MO. The pulse generator 17 generates control pulses in response to control signals from the control unit 7 of the module controller CTN1. For example, the pulse generator 17 outputs the control pulses whose pulse width has been modulated. The control pulses for a switch (MOSFET) S01 on the secondary side of the flyback transformer T1 are supplied from an MCU (Micro Controller Unit) in the communication unit COM1.

Based on the voltage information from the power storage device 1 and the power storage devices MO, the control box ICNT decides the sequence of the balance between the power storage devices. The presence or absence of the charging and discharging of the balance between the power storage devices is individually transmitted to the MCU in each power storage device. The MCU supplies the control signal directly to the secondary side of the flyback transformer or transmits the control signal to the primary side of the flyback transformer T1 through the insulated communication via the insulating unit ISC1.

The temperature detector 15 includes a temperature detection element such as a thermistor. The analog temperature data T representing the temperature of each of the battery blocks B1 to B16 detected by the temperature detector 15 are supplied to a cell temperature multiplexer 16 (MUX 16). For example, the analog temperature data T1 representing the temperature of the battery block B1 are supplied to the MUX 16. The analog temperature data T2 representing the temperature of the battery block B2 are supplied to the MUX 16. Similarly, the analog temperature data T3 to analog temperature data T16 respectively representing the temperature of the battery blocks B3 to B16 are supplied to the MUX 16.

The MUX 16 switches the channels in response to a predetermined control signal to select one piece of analog temperature data T from 16 pieces of analog temperature data T1 to T16. The one piece of analog temperature data T selected by the MUX 16 are supplied to the ADC 6.

The current detector 9 detects the value of current flowing through the plural battery blocks B1 to B16. The current detector 9 includes, for example, a current detection resistor 9a and a current detection amplifier 9b. The current detection resistor 9a detects the analog current data representing the voltage value at the both opposite ends of the current detection resistor 9a. The analog current data are constantly detected either during the charging or the discharging, for example. The analog current data may be detected at a predetermined cycle.

The detected analog current data are supplied to the current detection amplifier 9b. The current detection amplifier 9b amplifies the analog current data. The amplified analog current data are supplied to the ADC 6.

With the ADC 6, the analog current data supplied from the current detection amplifier 9b are converted into the digital current data. The analog current data are converted into the digital current data and the digital current data are output by the ADC 6.

For example, upon the detection of the flow of excessively large current at the discharging, the module controller CTN1 determines the state as the over-current discharging state and controls the switch (not shown) to an open state (state of blocking the current). On the other hand, upon the detection of excessively large current in the charging, the module controller CTN1 controls the switch (not shown) to an open state (state of blocking the current).

The insulating unit ISC1 has a function of insulating between the communication unit COM1 and the module controller CTN1. In other words, the reference potential of the power source of the communication unit COM1 and the reference potential of the power source of the module controller CTN1 are separated and made independent. Moreover, in the insulated state, the insulating unit ISC1 has the function of supplying the power source voltage to the module controller CTN1 and the function as a transmission medium of the bidirectional communication.

In the bidirectional communication conducted through the insulating unit ISC1, for example, CAN specification can be used. As the power transmission conducted through the insulating unit ISC1, an electromagnetic induction type, a magnetic resonance type, a radio wave reception type, or the like can be used.

In the first embodiment, for example, a noncontact IC card technique is used. In the noncontact IC card technique, communication and power transmission are conducted between a reader/writer and a card by the magnetic coupling between an antenna coil of the reader/writer and an antenna coil of the card. The communication is conducted at a speed of 212 or 424 kbps by using a method in which the carrier wave with a frequency of 13.56 kHz is modulated by ASK (Amplitude Shift Keying). The insulating unit ISC1 has the specification similar to the noncontact IC card. Moreover, for example, the insulating unit ISC1 performs the communication and the power transmission between the antennas (coils) formed in the different layers of the multilayer printed board.

(Front End Portion of Power Storage Device)

FIG. 5 is an exploded perspective diagram illustrating a front end portion of a power storage device. FIG. 6 is a perspective diagram illustrating a member that is removed with the front plane portion. FIG. 7 is a perspective diagram illustrating the state in which the front plane portion has been removed.

As illustrated in FIG. 5, the front plane portion 20a is covered with the protective cover 21, and the space for housing the component group including the board and the like is secured on the inner surface side of the front plane portion 20a. In this space, the component group including at least an external communication board 45 and an output terminal board 44 illustrated in FIG. 6 is disposed and fixed. This component group specifically includes, for example, the output terminal board 44 provided with the external positive electrode terminal 4 and the external negative electrode terminal 5, which correspond to output terminals, the external communication board 45, a fuse 2, bus bars 47a1 to 47a3, a board holding member 49, connectors 3a and 3b, and the like. The external communication board 45 and the output terminal board 44 are connected to a main board 46 with a connector (not shown). The board holding member 49 is formed of an insulating material such as resin, and plays the role of holding the boards mechanically and additionally insulating between the boards and between the board and the components, for example. Moreover, two sub-boards 42 are fixed to the battery unit 51 and the battery unit 52. For example, the sub-board 42 is disposed and fixed so that one main plane of the sub-board 42 is opposite to, and partly in close contact with one wall surface among four wall surfaces of the battery case 61, which is orthogonal to the column direction of the battery column. The sub-boards 42, the output terminal board 44, the external communication board 45, and the main board 46 have a control block mounted thereon, the control block including monitor and control circuits as illustrated in FIG. 3 and FIG. 4. Thus, the component group including the plural boards and the like configured separately is disposed between the inner surface of the front plane portion 20a and the front wall surface of the battery unit 51 and the battery unit 52 and each is connected with a connection member or a connector such as a plate-shaped member, for example, the bus bars 47a1 to 47a3. Accordingly, the connection between the boards is easily possible. Such a power storage device 1 is capable of easy and efficient assembly and can achieve high energy due to the space reduction.

When the front plane portion 20a covered with the protective cover 21 is removed, the component group including at least the external communication board 45 and the output terminal board 44 is also removed together with the front plane portion 20a. As illustrated in FIG. 7, when the front plane portion 20a and the component group are removed, the portion including the main board 46 disposed more on the rear side than the component group is exposed to the outside from the opening of the exterior case 20 from which the front plane portion 20a has been removed. Then, the operator can put his hand into the opening to maintain the main board 46, for example, or extract the main board 46 quickly. Thus, simply by removing the front plane portion 20a and the component group together with the front plane portion 20a enables the maintenance of the main board 46, whereby the maintenability can be improved. That is to say, the maintenance, the inspection, and the exchange of the components included in the component group can be facilitated. Further, the complicated wire extraction and rearrangement of the wires can be omitted.

The external positive electrode terminal 4 and the external negative electrode terminal 5 provided for the power storage device 1 for charging and discharging are exposed to the outside through the opening provided for the protective cover 21 and the front plane portion 20a.

The front plane portion 20a and the protective cover 21 of the power storage device 1 are provided with windows 25a, 25b, 26a, and 26b which are close to each other. As illustrated in FIG. 1, the windows 25a, 25b, 26a, and 26b are covered with a conductive member 11 during the operation of the power storage device 1.

The connectors 3a and 3b are installed inside the windows 25a and 25b of the front plane portion 20a. As illustrated in FIG. 8, the terminals of the battery blocks B1 to B16 connected in series on the positive electrode side are connected to the connector 3a through the fuse 2 serving as a current blocking element. The other connector 3b is provided near the connector 3a. The connector 3b is connected to the external positive electrode terminal 4. The terminal of the battery blocks B1 to B16 on the negative electrode side is connected to the external negative electrode terminal 5.

As the connection portion for the connectors 3a and 3b, the conductive member 11 capable of free insertion and removal is provided for preventing the wrong connection. The conductive member 11 has a structure that a conductive plate is bent to have a pair of plate-shaped projections 12a and 12b and a base part of the conductive plate is attached to one surface of a support plate 13. By extension of one end of the support plate 13, a cover 14 is formed. Further, the other surface of the support plate 13 is provided with a knob 15. The support plate 13 having the cover 14 and the knob 15 is, for example, a molded product of synthetic resin.

The connectors 3a and 3b have two spring contact plates disposed to face each other, and have a space between the two spring contact plates into which the plate-shaped projections 12a and 12b of the conductive member 11 can be inserted through the windows 25a and 25b. Moreover, the windows 26a and 26b can be closed by the cover 14 integrated with the support plate 13 of the conductive member 11. Since the plate-shaped projections 12a and 12b are held by the two spring contact plates of the connectors 3a and 3b, the state in which the conductive member 11 is inserted in the connectors 3a and 3b can be maintained.

By the insertion of the plate-shaped projections 12a and 12b of the conductive member 11 into the space of each connector, the connectors 3a and 3b are connected (made electrically conductive) by the conductive member 11. On the other hand, by the removal of the plate-shaped projections 12a and 12b of the conductive member 11 out of the space of each connector, the connectors 3a and 3b are disconnected (made electrically nonconductive). In this manner, the connected state in which the conductive member 11 is inserted into the connectors 3a and 3b and the disconnected state in which the conductive member 11 is removed from the connectors 3a and 3b can be switched.

An electronic component 28 for setting or connecting is disposed inside the windows 26a and 26b provided for the front plane portion 20a. The electronic component 28 corresponds to, for example, a slide switch, a rotary switch, a JTAG connector, etc. For example, the address for the power storage device 1 is set by the rotary switch. In other words, a plurality of power storage devices 1 can be connected and used, and in the case of connecting the plural devices, the identification address is set for each of the power storage devices. The external controller performs the control process based on the addresses. The slide switch is used to increase the address specified by the rotary switch.

The JTAG connector is a standard connector suggested by JTAG (Joint European Test Action). The test data are input/output for inspecting an MPU (Micro Processing Unit), an IC (Integrated Circuit), and the like in the case through the JTAG connector. Moreover, the firmware of the internal MPU is rewritten. Note that the electronic component may be other switching components or connectors than those described above.

In the connected state in which the conductive member 11 is inserted into the connectors 3a and 3b, the cover 14 covers the windows 25a, 25b, 26a, and 26b in front of the operation plane of the electronic component. In other words, in the connected state, the access to the electronic component is prohibited. On the other hand, removing the conductive member 11 from the connectors 3a and 3b opens the window in front of the operation plane of the setting unit, and by operating the operation plane through the windows 25a, 25b, 26a, and 26b, the address of the power storage device 1 can be set, for example.

The access to the operation plane becomes possible only when the conductive member 11 is removed to open the windows 25a, 25b, 26a, and 26b in front of the operation plane, and thus the operation setting of the electronic component becomes possible. By conducting the setting operation from the outside of the exterior case 20, the workability can be improved and the safety is increased as compared to the case of operating the electronic component inside the case.

Moreover, the power storage device 1 is provided with a connector 27, which is the communication terminal for the communication with the external controller. As described above, the power storage device 1 is provided with control blocks for monitoring the voltage, current, and temperature of the battery. The information from the control block is transmitted to the external controller through the communication. The external controller executes the management for the charging, discharging, and deterioration suppression.

As the communication with the external controller made via the connector 27, for example, a serial interface is used. As the serial interface, specifically, an SM bus (System Management Bus) or the like is used. For example, I2C bus can be used. I2C bus is for the synchronous serial communication performing the communication through two signal lines of bidirectional SDA (serial data) and SCL (serial clock).

(Battery Unit)

FIG. 9 is an exploded perspective diagram illustrating a structure example of a battery unit. The battery unit 51 is formed by housing the battery block group 10 including a plurality of battery cell blocks, the partition plate 93, the connection terminal portion 91, and a positive electrode insulating sheet 92 in the battery case 61 including the top case 61a and the bottom case 61b. Note that the battery unit 52 has the structure similar to the battery unit 51. Therefore, the structure of the battery unit 51 is specifically described and the detailed description of the battery unit 52 is omitted.

(Battery Case)

The battery case 61 includes the top case 61a and the bottom case 61b. The battery case 61 is, for example, a resin molded product made of the electrically insulating resin.

FIG. 10 is a perspective diagram illustrating a structure example of the top case 61a. The top case 61a includes a top plane portion and wall portions standing around the top plane portion. The top plane portion of the top case 61a is provided with a plurality of openings 71 at which the connection terminal portion 91 disposed on the terminal plane of the battery cells 10a is exposed. The top plane portion of the top case 61a is provided with a plurality of holes 72 to which projections 93a of the partition plate 93, which will be described below, are fitted. Moreover, engagement parts 62 are provided projecting from the top plane portion of the top case 61a. The projecting engagement parts 62 are provided to form a space S between the battery unit 51 and the battery unit 52 that face each other, and moreover, by combining the battery unit 51 and the battery unit 52, the space S can be stably maintained. Although not shown, the top plane portion of the top case 61a may be provided with a hole into which the thermistor is inserted.

The bottom case 61b includes a bottom plane portion and wall portions standing around the bottom plane portion. Although not shown, four hollow structure bodies are provided in the columnar shape in the center of the bottom plane portion, and are fitted to hollow structure bodies 70 of the top case 61a to be combined with the top case 61a. The hollow structure body of the bottom case 61b is, for example, a hollow structure which has a hollow cylindrical shape whose top plane is open and bottom plane has a hole in the center. Note that the hole is fitted to the projection of the side plane portion 20f, and is fixed with a screw as necessary, whereby the battery unit 51 is fixed to the side plane portion 20f. Although not illustrated, the bottom plane portion of the bottom case 61b is provided with the plurality of openings 71 at which the connection terminal portion 91b is exposed in a manner similar to the top plane portion of the top case 61a. The bottom plane portion of the bottom case 61b is provided with the holes 72 into which the projections 93a of the partition plate 93 to be described below are fitted.

FIG. 11 is a perspective diagram illustrating the state before the two battery units are combined. As illustrated in FIG. 11, when the battery unit 51 and the battery unit 52 are combined, the top plane portion of the top case 61a of the battery unit 51 and the top plane portion of the top case 61a of the battery unit 52 are disposed to face each other and the engagement parts 62 projecting from one top plane portion and the engagement parts 62 projecting from the other top plane portion are fitted to each other.

(Battery Block Group)

Back to FIG. 9, the battery block group 10 has a structure in which the battery columns including the plural battery cells 10a disposed linearly are arranged in parallel to a direction approximately orthogonal to the column direction of the battery column. Each of the battery columns includes, for example, 14 batteries.

The battery block group 10 is a battery pack in which the plural battery cells 10a are electrically connected to each other. The plural battery cells 10a included in the battery block group 10 are electrically connected to each other by the connection terminal portion 91. For example, the battery columns constitute the battery blocks B1 to B8 having the battery cells 10a connected in parallel. Further, the battery blocks B1 to B8 are connected to each other in series to constitute the battery block group 10.

Although not illustrated, the battery block group 10 housed in the battery case 61 of the battery unit 52 has the similar structure. For example, in each column of the battery columns L1 to L8, the battery cells 10a connected in parallel constitute the battery blocks B9 to B16. Moreover, the battery blocks B9 to B16 are connected in series to constitute the battery block group 10.

In the battery block group 10, the plural battery columns (battery columns L1 to L8) having the plural battery cells 10a connected in parallel are arranged in a direction approximately orthogonal to the column direction and by connecting the columns in series, the current path can be rectified in a single direction (for example, in a direction approximately orthogonal to the column direction of the battery column), and moreover the total length of the current path can be shortened, whereby the increase in resistance value can be suppressed.

In the battery block group 10, the battery column L1 and the battery column L2 are disposed to face each other, the battery column L2 and the battery column L3 are disposed to face each other, the battery column L3 and the battery column L4 are disposed to face each other, the battery column L4 and the battery column L5 are disposed to face each other, the battery column L5 and the battery column L6 are disposed to face each other, and the battery column L7 and the battery column L8 are disposed to face each other. In the battery columns L1, L3, L5, and L7, the battery cells 10a are disposed so that the top plane corresponds to the positive electrode terminal plane and the bottom plane corresponds to the negative electrode terminal plane. In the battery columns L2, L4, L6, and L8, the battery cells 10a in each battery column are disposed so that the top plane corresponds to the negative electrode terminal plane and the bottom plane corresponds to the positive electrode terminal plane.

In the odd-numbered battery columns L1, L3, L5, and L7, the battery cells 10a included in each battery column are disposed linearly and in the close contact state. In the example illustrated in FIG. 9, in the odd-numbered battery columns L1, L3, L5, and L7, the 14 battery cells 10a included in each battery column are disposed linearly and in the close contact state.

On the other hand, in the even-numbered battery columns L2, L4, L6, and L8, the battery cells 10a included in the battery columns are disposed so that the space substantially corresponding to one battery cell 10a is provided between two sets of battery cells 10a disposed linearly and in the close contact state. The space substantially corresponding to one battery is preferably disposed at the position opposite to the center of the battery columns L1, L3, L5 or L7 that are adjacent to and opposite to each other.

In the even-numbered battery columns L2, L4, L6, and L8, the 14 battery cells 10a included in each battery column are disposed so that the space corresponding to one battery cell 10a is provided between two sets of seven battery cells 10a disposed linearly and in the close contact state. The space substantially corresponding to one battery is provided at the position opposite to the center of the battery columns L1, L3, L5 or L7 that are adjacent to and opposite to each other.

In the space substantially corresponding to one battery cell 10a, the hollow structure body of the bottom case 61b (not shown) and the hollow structure body 70 of the top case 61a that faces the aforementioned hollow structure body are fitted. As described above, the bottom plane of the hollow structure body of the top case 61a is provided with the holes into which the projections of the side plane portion 20f are fitted and fixed with a screw if necessary, whereby the battery unit 51 is fixed to the side plane portion 20f. Since the fixing portion for the side plane portion 20f is provided near the center of the battery unit 51, it is possible to suppress the swelling around the center of the battery unit 51 that is caused by the displacement of the battery cells 10a included in the battery block group 10, for example.

In the battery block group 10 including the battery columns L1 to L8, the adjacent battery columns are stacked into a triangular shape while being displaced in the column direction by the length substantially equal to the radius of the circumference of the external radius of the battery cell 10a. The arrangement in the triangular stacked state includes the arrangement in which the substantial centers of the end surfaces of two adjacent battery cells 10a in one column and the substance center of the battery cell 10a in another column adjacent to the one column, which is between the two battery cells 10a adjacent to the one column, form a substantially regular triangle.

In the arrangement in the triangular stacked state, a larger number of battery cells 10a can be housed in the limited space of the battery case 61. Therefore, the number of battery cells per unit area can be increased and the energy density of the power storage device 1 can be improved.

(Connection Terminal Portion on Top Case Side)

The connection terminal portion 91 as the coupling member, which electrically connects the plural battery cells 10a, is provided on the terminal plane of the battery cells 10a. One connection terminal portion 91 is electrically coupled with the terminal on the bottom plane of the battery cells 10a included in the two adjacent battery columns. The connection terminal portion 91 is, for example, a plate-shaped body with an approximately rectangular planar shape, which will be described specifically below.

(Connection Terminal Portion on Bottom Case Side)

The connection terminal portions 91 are arranged side by side in a direction approximately orthogonal to the column direction of the battery column as the connection terminal portion 91 on the plane on the inside of the bottom plane portion of the bottom case 61b. One connection terminal portion 91 is electrically coupled with the terminal on the bottom plane of the battery cell 10a included in the two adjacent battery columns.

(Positive Electrode Insulating Sheet on Top Case Side)

The positive electrode insulating sheet 92 is overlapped on the positive electrode terminal plane of the battery cell 10a included in the battery block group 10. Specifically, the positive electrode insulating sheet 92 is overlapped on the positive electrode terminal plane of the battery cell 10a whose top plane is the positive electrode terminal plane. The positive electrode insulating sheet 92 is overlapped on the positive electrode terminal plane of the plural battery cells 10a constituting the battery columns.

The positive electrode insulating sheet 92 is formed of the material having the insulating property, such as the resin material with the insulating property. The positive electrode insulating sheet 92 is provided with the openings into which the plural convex positive electrode terminals are fitted.

Into each of the openings of the positive electrode insulating sheet 92, each positive electrode terminal is fitted, and the positive electrode terminals are exposed from the opening of the positive electrode insulating sheet 92. The positive electrode terminal exposed from the opening of the positive electrode insulating sheet 92 is electrically coupled with the connection terminal portion 91a or the connection terminal portion 91b. On the other hand, by covering the peripheral plane of the positive electrode terminal with the positive electrode insulating sheet 92, the peripheral plane of the positive electrode terminals is electrically insulated from the connection terminal portion 91a or the connection terminal portion 91b.

(Positive Electrode Insulating Sheet on Bottom Case Side)

In a manner similar to the positive electrode insulating sheet 92 on the bottom case side, the positive electrode insulating sheet 92 on the bottom case 61b side is to suppress the short-circuiting between the peripheral plane of the convex positive electrode terminal and the connection terminal portion 91b. The positive electrode insulating sheet 92 on the battery case side is overlapped on the positive electrode terminal plane of the battery cells 10a in the battery columns L2, L4, L6 and L8.

(Structure of Partition Plate)

(Partition Plate)

FIG. 12 is a schematic perspective diagram illustrating the structure of the partition plate and the state before the partition plate and the battery block group are combined. The partition plate 93 is to be fitted between the battery columns that are opposite to and adjacent to each other in the battery block group 10 as indicated by an arrow. The partition plate 93 is, for example, the resin molded product made of the resin with the electrically insulating property.

Moreover, the partition plate 93 is detachable from the battery case 61. The partition plate 93 includes a plurality of projections 93a on the top plane and the bottom plane, and by having the projections 93a fitted to the holes 72 of the battery case 61, the partition plate 93 can be attached to the battery case 61 and removed from the battery case 61 by removing the fitted projections out of the hole.

For example, the plural projections 93a are provided at predetermined positions on the top plane and the bottom plane of the partition plate 93. The projections 93a on the top plane are fitted to the holes 72 for positioning of the partition plate, which are provided at predetermined positions of the top case 61a, and the projections 93a provided on the bottom plane are fitted to the holes 72 for positioning of the partition plate, which are provided at predetermined positions of the bottom case 61b. Thus, the partition plate 93 is fixed between the top case 61a and the bottom case 61b.

By the fixed partition plate 93, the plural battery cells 10a can be disposed and fixed at the predetermined positions. Thus, the battery block group 10 in which the battery cells 10a are fixed according to the optimum arrangement for the high energy density can be configured without the use of a conventional holder case including a plurality of individual battery holders whose shape suits each battery. Moreover, by providing the fixed partition plate 93 between the battery columns stacked in the state that the side plane of the battery cell 10a faces in the vertical direction, the load applied from the upper battery cell 10a to the lower battery cell 10a can be reduced and the pressure and stress can be dispersed, so that the force applied to the battery block group 10 can be distributed. Thus, the deformation of the battery cells 10a and the like can be suppressed.

(Details of Connection Terminal Portion of Present Technique)

Detailed description of the connection terminal portion 91 of the present technique is hereinafter made. First, for helping the understanding of the present technique, the typical connection terminal portion with a structure different from that of the connection terminal portion 91 of the present technique is described and then, the structure example of the connection terminal portion 91 of the present technique is described.

Figure 13B:
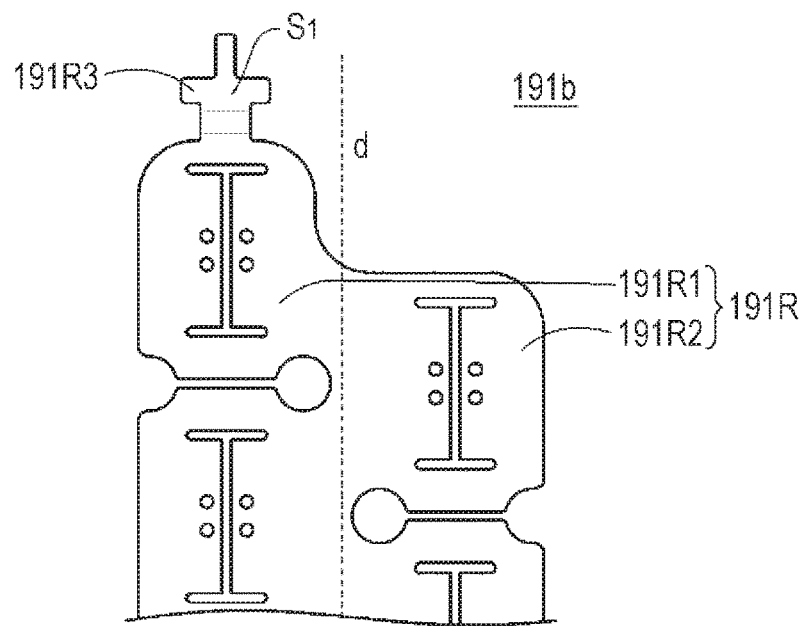
FIG. 13B is a plan diagram illustrating the part of the connection terminal portion having the structure different from that of the present technique.

FIG. 13A is a perspective diagram illustrating a part of the connection terminal portion having a structure different from that of the present technique. FIG. 13B is a plan diagram illustrating the part of the connection terminal portion having the structure different from that of the present technique. As illustrated in FIG. 13A and FIG. 13B, this connection terminal portion 191b has a coupling portion 191R which couples the terminal planes of the two battery columns and an extension portion 191R3 to be connected to the sub-board 42 for sensing the voltage of the battery cells 10a.

The coupling portion 191R includes a first coupling portion 191R1 to be coupled with the terminal plane of one battery column, and a second coupling portion 191R2 to be coupled with the terminal plane of the other battery column that is adjacent to the one battery column. The first coupling portion 191R1 corresponds to an approximately half portion on the front side sectioned by the center line d along the longitudinal direction passing the center in the short-side direction of the connection terminal portion 191b. The second coupling portion 191R2 corresponds to an approximately half portion on the rear side sectioned by the same center line d.

The extension portion 191R3 corresponds to a portion extended in a long and thin shape with a narrower width than the width of the first coupling portion 191R1 from the substantially central portion of one end of the first coupling portion 191R1 in the longitudinal direction. An end of this extension portion 191R3 is connected to the sub-board 42 and is assumed as a sensing position $S_1$, at which each voltage of the battery columns L1 to L8 is sensed.

FIG. 14 is a plan diagram of the power storage device including the connection terminal portion as illustrated in FIG. 13A and FIG. 13B. FIG. 15 is a schematic diagram illustrating the arrangement of the connection terminal portion on the top plane side and the connection terminal portion on the bottom plane side, which corresponds to FIG. 14 that is viewed from the top plane side of the battery cell. FIG. 16A to FIG. 16D are schematic diagrams illustrating the polarity of the terminal plane of the battery cell coupled to the connection terminal portion on the top plane side and the connection terminal portion on the bottom plane side, and the electric structure. Note that in FIG. 15 and FIG. 16A to FIG. 16D, the connection terminal portion 191a is not illustrated.

In the battery columns L1, L3, L5, and L7 illustrated in FIG. 14, the battery cells 10a included in the battery columns are arranged so that the top plane is the negative electrode terminal plane and the bottom plane is the positive electrode terminal plane. In the battery columns L2, L4, L6, and L8, the battery cells 10a included in the battery columns are arranged so that the top plane is the positive electrode terminal plane and the bottom plane is the negative electrode terminal plane.

As illustrated in FIG. 15, on the top plane side of the battery cell 10a, two connection terminal portions 191a (not shown) and three connection terminal portions $191b_1$ are arranged side by side in a direction approximately orthogonal to the column direction of the battery column, and on the bottom plane side of the battery cell 10a, four connection terminal portions $191b_2$ illustrated with dotted lines are arranged side by side in a direction approximately orthogonal to the column direction of the battery column. Note that the connection terminal portion $191b_1$ and the connection terminal portion $191b_2$ are referred to as the connection terminal portion 191b unless they need to be distinguished.

Figure 16A:
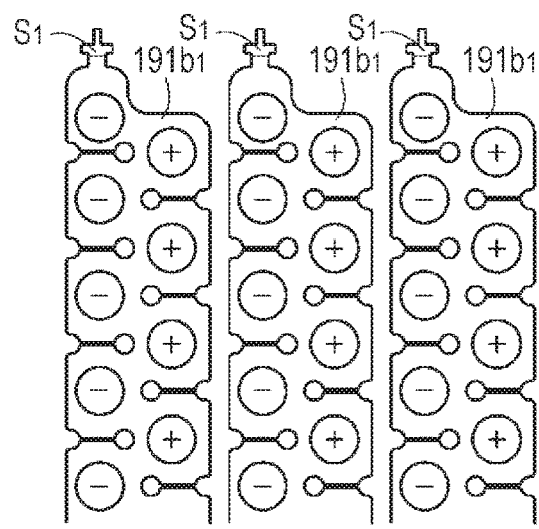
FIG. 16A to FIG. 16D are schematic diagrams illustrating the polarity of the terminal planes of the battery cells coupled to the connection terminal portion on the top plane side and the connection terminal portion on the bottom plane side, and the electric structure.

As illustrated in FIG. 16A, the connection terminal portion $191b_1$ is electrically coupled with the positive electrode terminals of the battery cells 10a included in the battery column L2 and the negative electrode terminals of the battery cells 10a included in the battery column L3. The connection terminal portion $191b_1$ is electrically coupled with the positive electrode terminals of the battery cells 10a included in the battery column L4 and the negative electrode terminals of the battery cells 10a included in the battery column L5. Moreover, the connection terminal portion $191b_1$ is electrically coupled with the positive electrode terminals of the battery cells 10a included in the battery column L6 and the negative electrode terminals of the battery cells 10a included in the battery column L7.

Figure 16B:
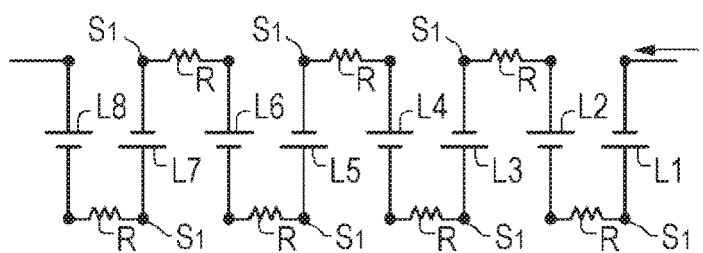
Figure 16C:
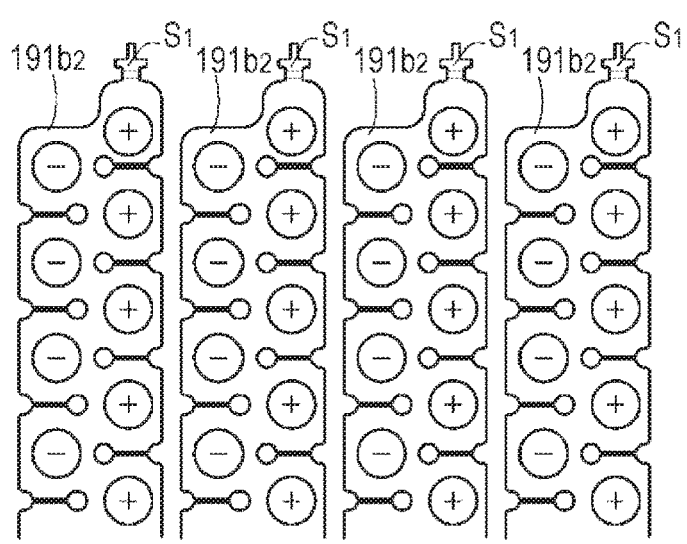

As illustrated in FIG. 16C, the connection terminal portion $191b_2$ is electrically coupled with the positive electrode terminals of the battery cells 10a included in the battery column L1 and the negative electrode terminals of the battery cells 10a included in the battery column L2. The connection terminal portion $191b_2$ is electrically coupled with the positive electrode terminals of the battery cells 10a included in the battery column L3 and the negative electrode terminals of the battery cells 10a included in the battery column L4. Moreover, the connection terminal portion 191b is electrically coupled with the positive electrode terminals of the battery cells 10a included in the battery column L5 and the negative electrode terminals of the battery cells 10a included in the battery column L6. Moreover, the connection terminal portion 191b is electrically coupled with the positive electrode terminals of the battery cells 10a included in the battery column L7 and the negative electrode terminals of the battery cells 10a included in the battery column L8.

As illustrated in the electric structure in FIG. 16B, the battery columns L1, L3, L5, and L7 are close to the voltage sensing position $S_1$; on the other hand, the battery columns L2, L4, L6, and L8 are far from the voltage sensing position $S_1$.

Figure 16D:
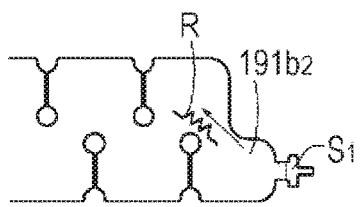

As illustrated in FIG. 16D, for example, in the connection terminal portion $191b_2$ where the two battery columns are coupled, current flows between the two battery columns through a resistor R, which is the portion where the resistance of the connection terminal portion $191b_2$ is generated from the sensing position $S_1$, as indicated by an arrow. Therefore, at the sensing position $S_1$, the voltage of the battery column that is far from the sensing position $S_1$ is sensed after being influenced by the voltage drop due to the resistor R. On the other hand, at the sensing position $S_1$, the voltage of the battery column that is close to the sensing position $S_1$ is sensed without being influenced by the voltage drop due to the resistor R.

Therefore, in the two battery columns coupled to one connection terminal portion $191b$, the measurement error is caused in the sensed voltage between one battery column that is close to the sensing position $S_1$ and the other battery column that is far from the sensing position $S_1$ because of the voltage drop by the resistor R. Since large current (for example, 10 A or more) flows in the power storage device, the measurement error corresponding to the voltage drop due to the resistor R tends to be large. For solving this, in the present technique, the connection terminal portion with the structure as described below is employed.

(Structure of Connection Terminal Portion of Present Technique)

Figure 17A:
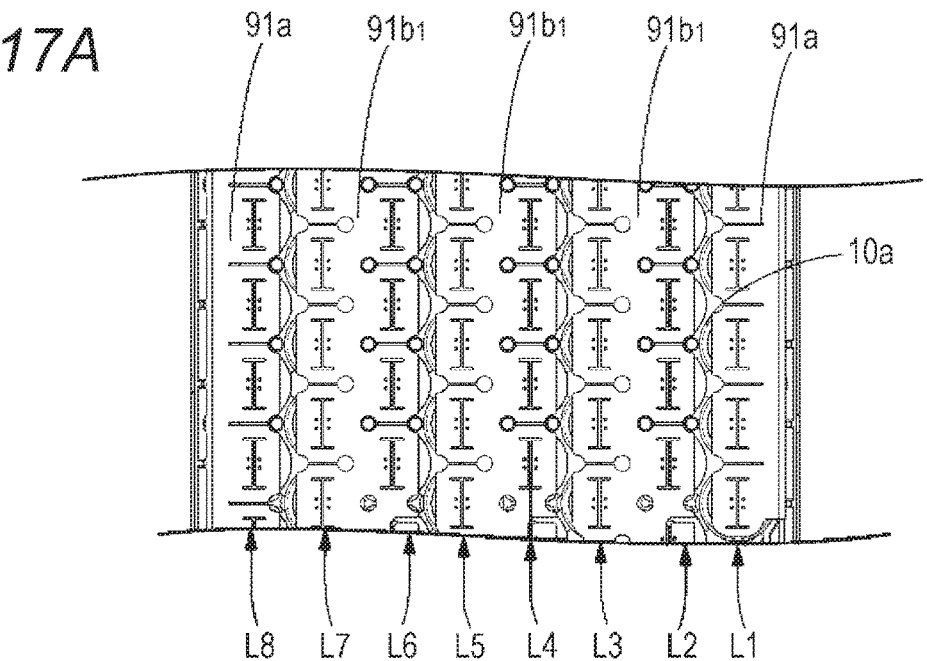
FIG. 17A is a plan diagram illustrating a part of a power storage device including a connection terminal portion of the present technique.
Figure 17B:
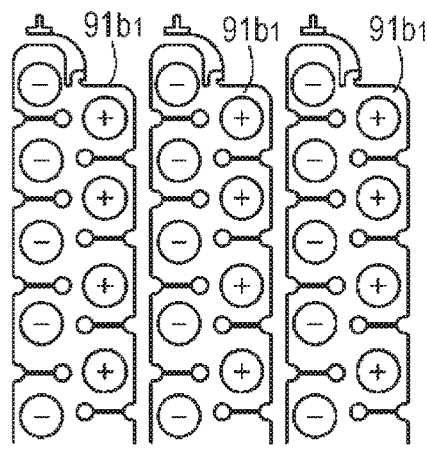
FIG. 17B and FIG. 17C are schematic diagrams illustrating the polarity of the terminal planes of the battery cells coupled to the connection terminal portion on the top plane side and the connection terminal portion on the bottom plane side.
Figure 17C:
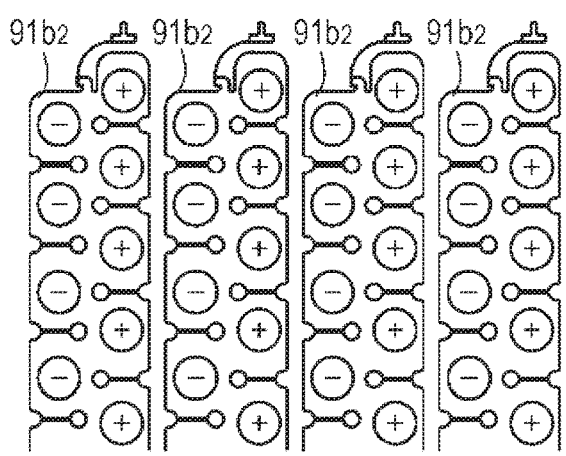

A structure example of a connection terminal portion of the present technique is described. FIG. 17A is a plan diagram illustrating a part of a power storage device including a connection terminal portion of the present technique. FIG. 17B is a schematic diagram illustrating the polarity of the terminal planes of the battery cell coupled to the connection terminal portion on the top plane side and the connection terminal portion on the bottom plane side, and the electric structure. Note that in FIG. 17B, the connection terminal portion 91a is not illustrated.

As illustrated in FIG. 17A and FIG. 17B, on the top plane side of the battery cell 10a, two connection terminal portions 91a and three connection terminal portions $91b_1$ are arranged side by side as the connection terminal portion 91 of the present technique in a direction approximately orthogonal to the column direction of the battery column, and on the bottom plane side of the battery cell, four connection terminal portions $91b_2$ are arranged side by side as the connection terminal portion 91 of the present technique in a direction approximately orthogonal to the column direction of the battery column. Note that the connection terminal portion $91b_1$ and the connection terminal portion $91b_2$ are referred to as the connection terminal portion 91b unless they need to be distinguished.

The connection terminal portion 91a is electrically coupled with the terminal planes of the battery cells 10a constituting one battery column. The connection terminal portion 91b is electrically coupled with the terminal planes of the battery cells 10a constituting the adjacent two battery columns. As the method of coupling, for example, electric resistance welding or laser heating welding is applicable; however, the method is not limited thereto and other known welding methods are applicable.

By connecting at least one battery column with one connection terminal portion 91a or one connection terminal portion 91b, the resistance value can be reduced and the heat generation of the terminal can also be reduced. Moreover, the coupling between the connection terminal portions is also possible by the simple coupling. Moreover, a measurement terminal for the battery cells 10a can be shared. Since the battery cells 10a constituting the battery column are coupled with one connection terminal portion, the assembling work can be simplified and the working efficiency at the assembly can be improved. In addition, the coupling portions can be reduced, whereby the temperature increase of the battery cells 10a at the coupling time in the assembly can be reduced. The heat generated in the charging and discharging of the battery cells 10a can be transmitted to the connection terminal portion 91a and the connection terminal portion 91b and released.

As illustrated in FIG. 17B, the connection terminal portion $91b_1$ is electrically coupled with the positive electrode terminals of the battery cells 10a included in the battery column L2 and with the negative electrode terminals of the battery cells 10a included in the battery column L3. The connection terminal portion $91b_1$ is electrically coupled with the positive electrode terminals of the battery cells 10a included in the battery column L4 and with the negative electrode terminals of the battery cells 10a included in the battery column L5. The connection terminal portion $91b_1$ is electrically coupled with the positive electrode terminals of the battery cells 10a included in the battery column L6 and with the negative electrode terminals of the battery cells 10a included in the battery column L7.

The connection terminal portion $91b_2$ is electrically coupled with the positive electrode terminals of the battery cells 10a included in the battery column L1 and with the negative electrode terminals of the battery cells 10a included in the battery column L2. The connection terminal portion $191b_2$ is electrically coupled with the positive electrode terminals of the battery cells 10a included in the battery column L3 and with the negative electrode terminals of the battery cells 10a included in the battery column L4. The connection terminal portion 191b is electrically coupled with the positive electrode terminals of the battery cells 10a included in the battery column L5 and with the negative electrode terminals of the battery cells 10a included in the battery column L6. The connection terminal portion 191b is electrically coupled with the positive electrode terminals of the battery cells 10a included in the battery column L7 and with the negative electrode terminals of the battery cells 10a included in the battery column L8.

FIG. 18 is a perspective diagram illustrating a structure example of the entire connection terminal portion of the present technique. The connection terminal portion 91b has an approximately line symmetric shape that is symmetric along a center line c along a short-side direction. A notch 99b exists in the center in the longitudinal direction. For example, the notch 99b has an arc-like shape. For example, the notch 99b of the connection terminal portion 91b is disposed at a position overlapping with a space substantially corresponding to one battery cell in the even-numbered battery column. By the provision of the notch 99b, the heat propagation can be suppressed. Moreover, if large current is generated in the occurrence of abnormality of the battery, the connection terminal portion 91 is fused starting from the notch 99b, thereby blocking the current. Note that the connection terminal portion 91a also has the similar cut portion 99a and notch 99b and has the approximately line symmetric shape that is symmetric along a center line along the short-side direction, whereby the effect similar to the aforementioned effect can be obtained.

FIG. 19A is a perspective diagram illustrating a part of the connection terminal portion illustrated in FIG. 18, and FIG. 19B is a plan diagram illustrating the part of the connection terminal portion illustrated in FIG. 18. The connection terminal portion 91*b* includes a coupling portion 91R to be connected to the terminal plane of two battery columns, and an extension portion 91R3 to be connected to the sub-board 42 for detecting the voltage of the battery cells 10*a*.

The coupling portion 91R includes a first coupling portion 91R1 to be coupled with the terminal plane of one battery column, and a second coupling portion 91R2 to be coupled with the terminal plane of the other battery column that is adjacent to the one battery column. The first coupling portion 91R1 corresponds to an approximately half portion on the front side (left side in FIG. 19B) sectioned by the center line d along the longitudinal direction passing the center in the short-side direction of the connection terminal portion 91*b*. The second coupling portion 91R2 corresponds to an approximately half portion on the rear side (right side in FIG. 19B) sectioned by the same center line d. The coupling portion 91R is coupled with the terminal plane of the one battery column and the terminal plane of the other battery column which are stacked into a triangular shape. For dealing with this, the first coupling portion 91R1 preferably has the portion that is extended by the length substantially equal to the radius of the circumference of the external shape of the battery cell in the longitudinal direction for each of one end and the other end of the second coupling portion 91R2.

The extension portion 91R3 corresponds to a portion extended from one end of the coupling portion 91R in the longitudinal direction. The extension portion 91R3 has, for example, smaller width than the first coupling portion 91R1 and the second coupling portion 91R2. An end of this extension portion 91R3 is connected to the sub-board 42 and is assumed as the sensing position $S_1$, at which each voltage of the battery columns is detected. For example, the voltage of each of the battery columns L1 to L8 connected in series and the battery columns L9 to L16 (not shown) connected in series is sensed and the voltage difference in the battery columns is sensed.

Note that the extension portion 91R3 may be formed integrally with the coupling portion 91R as illustrated in the example of FIG. 19A and FIG. 19B or may be formed separately from the coupling portion 91R and coupled with the coupling portion 91R. For example, as illustrated in FIG. 20, the extension portion 91R3 may be formed of an electric conductor such as a conductive wire, for example a harness, formed separately from the coupling portion 91R.

The extension portion 91R3 is provided so that the center p of an extension starting end t of the extension portion 91R3 comes to a predetermined position. For example, the extension portion 91R3 is provided so that the center p of the extension starting end t of the extension portion 91R3, which is illustrated with a dotted line, comes between the position of the horizontal distance L/12 on the first coupling portion 91R1 side from the center line d and the position of the horizontal distance 3L/12 on the second coupling portion 91R2 side. Note that L refers to the distance in the horizontal direction between the center of one battery column coupled with the connection terminal portion 91*b* and the center of the other battery column adjacent to the one battery column. Note that the range of the position includes the position at the boundary value (this also applies similarly to the description below).

From the viewpoint of further improving the measurement accuracy, the extension portion 91R3 is preferably provided so that the center p of the extension starting end of the extension portion 91R3 comes between the position of the horizontal distance L/12 on the first coupling portion side from the center line d and the position of the distance 2L/12 in the horizontal direction on the second coupling portion side from the center line d. From the viewpoint of improving the measurement accuracy furthermore, the extension portion 91R3 is preferably provided so that the center p of the extension starting end of the extension portion 91R3 comes between the position of the horizontal distance L/12 on the first coupling portion 91R1 side from the center line d and the position of the horizontal distance L/12 on the second coupling portion 91R2 side from the center line d.

By providing the extension portion 91R3 in this manner, the distance between the battery cell in the one battery column coupled with the connection terminal portion 91*b* and the sensing position $S_1$ and the distance between the battery cell in the other battery column coupled with the connection terminal portion 91*b* and the sensing position $S_1$ can be made appropriate. As a result, it is possible to prevent the voltage of the battery cell sensed at the sensing position $S_1$ from being influenced by the voltage drop due to the resistance of the connection terminal portion 91*b*.

The connection terminal portion 91*b* is provided with a plurality of holes 96 through which the projections 93*a* of the partition plate 93 are inserted. The connection terminal portion 91*b* is provided so that a longitudinal direction thereof is in parallel to the column direction of the battery column. Moreover, one or more cut portions 99*a* are formed which are cut from a side end of the connection terminal portion 91*b* in a direction approximately perpendicular to the longitudinal direction of the connection terminal portion 91*b*. By the formation of this cut portion 99*a*, the heat propagation in the connection terminal portion 91*b* in the occurrence of the abnormal heat generation of the battery cell 10*a* can be suppressed.

This cut portion 99*a* is preferably formed at, for example, a position corresponding to the position between the adjacent battery cells 10*a* connected in parallel to each other. By the formation of the cut portion 99*a* at the position corresponding to the position between the adjacent battery cells 10*a*, the thermal influence of one battery cell 10*a* on the adjacent battery cell 10*a* can be effectively suppressed. Moreover, in the case where current flows from battery cell 10*a* connected in parallel in the occurrence of internal short-circuiting of the battery cell 10*a*, the connection terminal portion 91*b* is fused starting from the cut portion 99*a* due to Joule heat caused by the electric resistance of the connection terminal portion 91*b*, so that the incoming current can be blocked. Moreover, since the cut direction of the cut portion 99*a* is approximately parallel to the direction where current flows (direction where battery cell blocks are connected in series), the current flow is not interrupted in the normal use and the current flow in the abnormal direction can be interrupted only when the abnormality has been detected.

(Test Example)

In the test examples below, description is made of the results of examining the optimum position of the center p of the extension starting end t of the aforementioned extension portion 91R3. As illustrated in FIG. 21, in a connection terminal portion where the two battery columns are coupled, in regard to Points 0 to 11 (Point X) of the connection terminal portion set by dividing the distance L between the centers of the two battery columns evenly into 12 sections, the resistance value between Point A and Point X and the resistance value between Point X and Point B were measured. The measurement results are shown in Table 1. Moreover, the graphs based on the measurement results are shown in FIG. 22.

TABLE 1

| | Horizontal distance from center line | Point X | Resistance value [milli-ohm] Point A to x | Resistance value [milli-ohm] Point X to B | Absolute value of difference in resistance value [milli-ohmΩ] |
|---|---|---|---|---|---|
| First coupling portion side | 6L/12 | 0 | 1.518 | 0.000 | 1.518 |
| | 5L/12 | 1 | 1.439 | 0.079 | 1.36 |
| | 4L/12 | 2 | 1.362 | 0.156 | 1.206 |
| | 3L/12 | 3 | 1.301 | 0.217 | 1.084 |
| | 2L/12 | 4 | 1.247 | 0.271 | 0.976 |
| | L/12 | 5 | 0.817 | 0.701 | 0.116 |
| Center | 0 | 6 | 0.794 | 0.724 | 0.07 |
| Second coupling portion side | L/12 | 7 | 0.733 | 0.785 | 0.052 |
| | 2L/12 | 8 | 0.644 | 0.874 | 0.23 |
| | 3L/12 | 9 | 0.565 | 0.953 | 0.388 |
| | 4L/12 | 10 | 0.468 | 1.050 | 0.582 |
| | 5L/12 | 11 | 0.211 | 1.307 | 1.096 |
| | 6L/12 | 12 | 0.000 | 1.518 | 1.518 |

As shown by Table 1 and FIG. 22, it has been confirmed that if Point X exists between the position of the horizontal distance L/12 on the first coupling portion side from the center line d and the position of the horizontal distance 3L/12 on the second coupling portion side from the center line d, the difference in resistance value is small, which is preferable. Moreover, it has been confirmed that if Point X exists between the position of the horizontal distance L/12 on the first coupling portion side from the center line d and the position of the horizontal distance 2L/12 on the second coupling portion side from the center line d, the difference in resistance value is smaller, which is more preferable. Furthermore, it has been confirmed that if Point X exists between the position of the horizontal distance L/12 on the first coupling portion side from the center line d and the position of the horizontal distance L/12 on the second coupling portion side from the center line d, the difference in resistance value is particularly small, which is particularly preferable.

2. Second Embodiment

Description is made of a structure example of a power storage device according to a second embodiment. The power storage device according to the second embodiment is similar to that of the first embodiment except that the connection terminal portion has the different structure. The structure of the connection terminal portion is described below and the others are similar to those of the first embodiment, so that the detailed description thereto is omitted.

(Connection Terminal Portion)

FIG. 23 is a plan diagram illustrating a part of the connection terminal portion. In a manner similar to the first embodiment, the connection terminal portion 91b is connected to the terminal plane of the two battery columns. The connection terminal portion 91b includes the coupling portion 91R and the extension portion 91R3. The coupling portion 91R includes the first coupling portion 91R1 to be coupled with the terminal plane of one battery column and the second coupling portion 91R2 to be coupled with the terminal plane of the other battery column that is adjacent to the one battery column.

The extension portion 91R3 is obtained by uniting a portion extended from one end of the first coupling portion 91R1 in a longitudinal direction and a portion extended from one end of the second coupling portion 91R2 in a longitudinal direction. In the second embodiment, the difference between the distance between the battery cell in one battery column among the two battery columns coupled to one connection terminal portion 91b and the sensing position and the distance between the battery cell in the other battery column and the sensing position can be reduced. As a result, the accuracy of sensing the voltage can be improved further.

3. Another Embodiment

The present technique is not limited to the embodiments of the present technique described above, and various modifications and applications within the scope not departing from the content of the present technique are possible.

For example, the numerals, structure, shapes, materials, raw materials, manufacturing process, etc. described in the above embodiments and examples are merely examples and numerals, structure, shapes, materials, raw materials, manufacturing process, etc. different from those above may be employed as necessary. For example, the plurality of projections and the plurality of holes may be one projection and one hole.

The structures, methods, processes, shapes, materials, and numerals described in the above embodiments and examples can be combined with each other unless departing from the content of the present technique.

In the first embodiment, the number of battery units housed in the exterior case 20 is two; however, the number of battery units housed in the exterior case 20 is not limited to two. For example, the number of battery units housed in the exterior case may be one or three or more. For example, in the power storage device, three or more battery units may be stacked horizontally in three stages or more and housed in the exterior case 20 in the state that the top plane portion of the top case 61a faces in the horizontal direction, or three or more battery units may be stacked horizontally in three stages or more and housed in the exterior case 20 in the state that the top plane portion of the top case 61a faces in the vertical direction. The bottom plane portion of the bottom case 61b may have the structure similar to the top plane portion of the top case 61a. The two battery units 51 and 52 may be stacked horizontally in two stages or more and housed in the exterior case 20 so that the top plane portion of the top case 61a and the bottom plane portion of the bottom case 61b face in the vertical direction. The coupling terminal portion may have the structure in which the terminal planes of three or more battery columns are coupled.

The power storage device according to an embodiment of the present technique may have the structure as below.

(1)

A battery pack including:

a battery block group in which a plurality of battery columns each including a plurality of battery cells disposed in a columnar shape is arranged side by side in a direction approximately orthogonal to a column direction; and a connection terminal portion which is coupled with terminal planes of the plurality of battery cells constituting at least two of the battery columns and whose longitudinal direction is in parallel to the column direction of the battery column, wherein the connection terminal portion includes a coupling portion including a first coupling portion to be coupled with one battery column and a second coupling portion to be coupled with the other battery column adjacent to the one battery column, and an extension portion extended from one end of the coupling portion in a longitudinal direction, and when a horizontal distance between the one battery column and the other battery column is L and a center line passing a center between the battery columns is set, a center of an extension starting end of the extension portion is between a position of a horizontal distance L/12 on the first coupling portion side from the center line and a position of a horizontal distance 3L/12 on the second coupling portion side from the center line.

(2)

The battery pack according to (1), wherein the center of the extension starting end of the extension portion is between the position of the horizontal distance L/12 on the first coupling portion side from the center line and a position of a horizontal distance 2L/12 on the second coupling portion side from the center line.

(3)

The battery pack according to (1), wherein the center of the extension starting end of the extension portion is between the position of the horizontal distance L/12 on the first coupling portion side from the center line and a position of a horizontal distance L/12 on the second coupling portion side from the center line.

(4)

The battery pack according to any of (1) to (3), wherein the adjacent two battery columns are stacked into a triangular shape while being displaced in the column direction by a length substantially equal to a radius of a circumference of an external radius of the battery cell.

(5)

The battery pack according to (4), wherein the first coupling portion has a portion that is extended in the longitudinal direction by a length substantially equal to the radius of the circumference of the external shape of the battery cell for each of one end and the other end of the second coupling portion in the longitudinal direction.

(6)

The battery pack according to any of (1) to (5), wherein the extension portion is connected to a board at which voltage of the battery cells is detected.

(7)

The battery pack according to any of (1) to (6), wherein the extension portion is formed integrally with the coupling portion.

(8)

The battery pack according to any of (1) to (7), wherein the extension portion is an electric conductor coupled with the coupling portion formed separately from the coupling portion.

(9)

The battery pack according to (8), wherein the electric conductor is a conductive wire.

(10)

A battery pack including:

a battery block group in which a plurality of battery columns each including a plurality of battery cells disposed in a columnar shape is arranged side by side in a direction approximately orthogonal to a column direction; and a connection terminal portion which is coupled with terminal planes of the plurality of battery cells constituting at least two of the battery columns and whose longitudinal direction is in parallel to the column direction of the battery column, wherein the connection terminal portion includes a coupling portion including a first coupling portion to be coupled with one battery column and a second coupling portion to be coupled with the other battery column adjacent to the one battery column, and an extension portion obtained by uniting a portion extended from one end of the first coupling portion in a longitudinal direction and a portion extended from one end of the second coupling portion in a longitudinal direction.

(11)

A power storage device including the battery pack according to any of (1) to (10).

(12)

A power storage system wherein the battery pack according to any of (1) to (10) is charged by a power generation device that generates power from renewable energy.

(13)

A power storage system including the battery pack according to any of (1) to (10) and supplying power to an electronic appliance connected to the battery pack.

(14)

An electronic appliance receiving power from the battery pack according to any of (1) to (10).

(15)

An electric vehicle including a conversion device that converts power received from the battery pack according to any of (1) to (10) into a driving force of a vehicle, and a control device that processes information in regard to vehicle control based on information related to the power storage device.

(16)

A power system including a power information transmission/reception unit that transmits and receives signals to and from another appliance through a network, wherein charging and discharging of the battery pack according to any of (1) to (10) is controlled based on information received by the transmission/reception unit.

(17)

A power system receiving power from the battery pack according to any of (1) to (10) or supplying power from a power generation device or a power network to the battery pack.

(18)

A battery module comprising:

a battery group including a plurality of battery columns, the battery columns include at least a first battery column and a second battery column each including a plurality of battery cells; and a connection terminal portion coupled with terminal planes of the battery cells, wherein the connection terminal portion includes a coupling portion including a first coupling portion configured to couple at least with the first battery column and a second coupling portion configured to couple at least with the second battery column adjacent to the first battery column, and an extension portion extended from an end of the coupling portion in a longitudinal direction, and when a horizontal distance between the first battery column and the second battery column is L and a center line between the first and second battery columns is set, a center of an extension starting end of the extension portion is between a first position of a horizontal distance L/12 on a first side of the first coupling portion from the center line and a second position of a horizontal distance 3L/12 on a second side of the second coupling portion from the center line.

(19)
The battery module according to (18), wherein the center of the extension starting end of the extension portion is between the first position of the horizontal distance L/12 on the first side from the center line and a third position of a horizontal distance 2L/12 on the second side from the center line.

(20)
The battery module according to any of (18)-(19), wherein the center of the extension starting end of the extension portion is between the first position of the horizontal distance L/12 on the first side from the center line and a fourth position of a horizontal distance L/12 on the second side from the center line.

(21)
The battery module according to any of (18)-(20), wherein the first and second battery columns are stacked into a triangular shape while being displaced in a column direction by a length substantially equal to a radius of a circumference of an external shape associated with the battery cells.

(22)
The battery module according to any of (18)-(21), wherein the first coupling portion has a first portion configured to extend in the longitudinal direction by a length substantially equal to the radius of the circumference of the external shape associated with the battery cells.

(23)
The battery module according to any of (18)-(22), wherein the extension portion connected to a board where a voltage of the battery cells is configured to be detected.

(24)
The battery module according to any of (18)-(23), wherein the extension portion is configured to be formed integrally with the coupling portion.

(25)
The battery module according to any of (18)-(24), wherein the extension portion is an electric conductor coupled with the coupling portion formed separately from the coupling portion.

(26)
The battery module according any of (18)-(25), wherein the electric conductor is a conductive wire.

(27)
A battery module comprising:
a battery group including a plurality of battery columns, the battery columns include at least a first battery column and a second battery column each including a plurality of battery cells; and a connection terminal portion coupled with terminal planes of the battery cells, wherein the connection terminal portion includes a coupling portion including a first coupling portion configured to couple at least with the first battery column and a second coupling portion configured to couple at least with the second battery column adjacent to the first battery column, and an extension portion obtained by connecting a first portion extended from a first end of the first coupling portion in a longitudinal direction and a second portion extended from a second end of the second coupling portion in a longitudinal direction.

(28)
A power storage device comprising the battery module according to any of (18)-(27).

(29)
A power storage system comprising the battery module according to any of (18)-(27), wherein the power storage system is configured to be charged by a power generation device that generates power from renewable energy.

(30)
A power storage system comprising the battery module according to any of (18)-(27), wherein the power storage system is configured to supply power to an electronic appliance connected to the battery module.

(31)
An electronic appliance configured to receive power from the battery module according to any of (18)-(27).

(32)
An electric vehicle comprising a conversion device that converts power, received from a power storage device including the battery module according to any of (18)-(27), into a driving force of the electric vehicle, and a control device configured to process information associated with vehicle control based on information related to the power storage device.

(33)
A power system comprising a power information transmission/reception unit configured to transmit and receive signal through a network, wherein charging and discharging of the battery module according to any of (18)-(27) is configured to be controlled based on information received by the power information transmission/reception unit.

(34)
A power system configured to at least one of receive power from the battery module according to any of (18)-(27) and supply power from at least one of a power generation device and a power network to the battery module.

(35)
A battery module comprising:
a battery group including a plurality of battery columns, the battery columns include at least a first battery column and a second battery column each including a plurality of battery cells; and a connection terminal portion coupled with terminal planes of the battery cells, wherein the connection terminal portion includes a coupling portion including a first coupling portion configured to couple at least with the first battery column and a second coupling portion configured to couple at least with the second battery column adjacent to the first battery column, and an extension portion connected to the connection terminal portion, wherein the extension portion is at a position to allow measurement of a first resistance value between the position and the first coupling portion and a second resistance value between the position and the second coupling portion, and wherein a resistance value difference between the first and second resistance values is 0.4 or less.

(36) A connection terminal portion for a battery module comprising:
a coupling portion including a first coupling portion configured to couple at least with a first battery column and a second coupling portion configured to couple at least with a second battery column adjacent to the first battery column, and
an extension portion extended from an end of the coupling portion in a longitudinal direction, and
when a horizontal distance between the first battery column and the second battery column is L and a center line between the first and second battery columns is set, a center of an extension starting end of the extension portion is between a first position of a horizontal distance L/12 on a first side of the first coupling portion from the center line and a second position of a horizontal distance 3L/12 on a second side of the second coupling portion from the center line.

4. Application Example

An application example of the power storage device including the battery pack is hereinafter described. Note that the application example of the power storage device is not limited to the application example described below.

The present technique may be the power storage system in which the battery pack of the above power storage device is charged by the power generation device that generates power from the renewable energy. The present technique may be the power storage system that includes the battery pack of the power storage device and supplies power to the electronic appliance connected to the battery pack of the power storage device. The present technique may be the electronic appliance that receives power from the battery pack of the above power storage device. These electronic appliance and power system are embodied as, for example, a power supply system for a house, and moreover embodied as a system that supplies efficiently the power in cooperation with the external power supply network. The present technique may be the electric vehicle including the conversion device that converts the power supplied from the battery pack of the power storage device into the driving force of the vehicle, and the control device that processes information in regard to the vehicle control based on the information related to the battery pack of the power storage device. The present technique may be the power system including the power information transmission/reception unit that transmits and receives the signals to and from another appliance through the network, wherein the charging and discharging of the battery pack of the power storage device is controlled based on the information received by the transmission/reception unit. The present technique may be the power system that receives the power from the battery pack of the power storage device or supplies the power to the battery pack of the power storage device from the power generation device or the power network.

(Power Storage System in House as Application Example)

An example in which the present technique is applied to a power storage system for a house is described with reference to FIG. 24. For example, in a power storage system 100 for a house 101, the electric power is supplied from a concentrated power system 102 such as a thermal power plant 102a, an atomic power plant 102b, or a hydroelectric power plant 102c through a power network 109, an information network 112, a smart meter 107, a power hub 108, etc. to the power storage device 103. In addition, the electric power is supplied to the power storage device 103 from an independent power source such as a power generation device 104. The electric power supplied to the power storage device 103 is accumulated. With the use of the power storage device 103, the electric power to be consumed in the house 101 is supplied. The similar power storage system can be used not just in the house 101 but also in the building.

The house 101 is provided with a control device 110 that controls each device of the power generation device 104, a power consumption device 105, the power storage device 103, and the like, the smart meter 107, and a sensor 111 that acquires pieces of information. The devices are connected by the power network 109 and the information network 112. As the power generation device 104, a solar cell, a fuel cell, a windmill and the like are used and the generated power is supplied to the power consumption device 105 and/or the power storage device 103. The power consumption device 105 corresponds to a refrigerator 105a, an air conditioner 105b, a television receiver 105c, a bathroom 105d, and the like. Moreover, an electric vehicle 106 is also included in the power consumption device 105. The electric vehicle 106 corresponds to an electric car 106a, a hybrid car 106b, and an electric bike 106c. The electric vehicle 106 may be a power-assisted bicycle.

The power storage device 103 includes the battery pack including the secondary battery or the like. For example, the battery pack includes a lithium ion secondary battery. As the power storage device 103, the power storage device 1 according to an embodiment of the present technique as described above can be used. One power storage device 1 or a plurality of power storage devices 1 is applicable. The smart meter 107 has the function of detecting the consumption amount of the commercial power and transmitting the detected amount to the power company. As the power network 109, any one of, or a plurality of DC power supply, AC power supply, and noncontact power supply may be used.

As the sensors 111, for example, a motion sensor, an illuminance sensor, an object detection sensor, a consumption power sensor, a vibration sensor, a contact sensor, a temperature sensor, an infrared ray sensor, and the like can be used. The information acquired by the sensors 111 is transmitted to the control device 110. By the use of the information from the sensor 111, the state of weather or the state of a person is known and the power consumption device 105 is automatically controlled to minimize the energy consumption. Moreover, the control device 110 can transmit the information in regard to the house 101 to the power company on the outside through the Internet.

By the power hub 108, the branching of the power line or the conversion between DC and AD is performed. As the communication method of the information network 112 connected to the control device 110, a method of using the communication interface such as UART (Universal Asynchronous Receiver Transmitter: asynchronous serial communication transmission/reception circuit), or a method of using a sensor network based on the wireless communication specification such as Bluetooth, ZigBee, or Wi-Fi is given. Bluetooth method is applied to the multimedia communication and one-to-many communication is possible. ZigBee uses the IEEE (Institute of Electrical and Electronics Engineers) 802.15.4 physical layer. IEEE 802.15.4 is the name of the short-range wireless network specification called PAN (Personal Area Network) or W (Wireless) PAN.

The control device 110 is connected to an external server 113. This server 113 may be managed by any of the house 101, the power company, and the service provider. The information transmitted to and received from the server 113 is, for example, the power consumption information, the life pattern information, the power rate, the weather information, the natural calamity information, and the information in regard to the electric power transaction. These pieces of information may be transmitted to or received from the power consumption device in the house (such as a television receiver) or the device outside the house (such as a cellular phone). These pieces of information may be displayed on the appliance with the display function, such as a television receiver, a cellular phone, or a PDA (Personal Digital Assistant).

The control device 110 controlling each unit is formed by a CPU (Central Processing Unit), RAM (Random Access Memory), ROM (Read Only Memory), or the like, and in this example, housed in the power storage device 103. The control device 110 is connected to the power storage device 103, the power generation device 104, the power consumption device 105, the sensor 111, and the server 113 through the information network 112, and has the function of adjusting the use amount of commercial power and the amount of power generation. In addition, the control device 110 may have the function of selling and buying the electric power in the power market.

As thus described, the generated power can be accumulated in the power storage device 103 from the power generation device 104 (solar power generation, wind power generation) in addition to the concentrated power system 102 such as the thermal power plant 102a, the atomic power plant 102b, or the hydroelectric power plant 102c. Therefore, even though the power generated from the power generation device 104 fluctuates, the control can be made so that the amount of power to be supplied to the outside can be made constant or just a necessary amount of power is discharged. For example, the power obtained from the solar power generation is accumulated in the power storage device 103 and the midnight power, which is the power that costs less in the nighttime, is accumulated in the power storage device 103 during the nighttime and in the daytime where the power costs high, the power accumulated in the power storage device 103 is discharged to be used.

Although this example has described the case in which the control device 110 is housed in the power storage device 103, the control device 110 may be housed in the smart meter 107 or may be configured alone. Moreover, the power storage system 100 may be used in a plurality of rooms in a condominium or a plurality of houses.

(Power Storage System in Vehicle as Application Example)

An example in which the present technique is applied to a power storage system for a vehicle is described with reference to FIG. 25. FIG. 25 schematically illustrates an example of the structure of a hybrid vehicle employing a series hybrid system to which the present technique is applied. The series hybrid system refers to a car driven by the power driving force conversion device by using the power generated by a power generator, which is driven by an engine, or the power obtained by accumulating the aforementioned power in a battery for a while.

This hybrid vehicle 200 includes an engine 201, a power generator 202, a power driving force conversion device 203, a driving wheel 204a, a driving wheel 204b, a wheel 205a, a wheel 205b, a battery 208, a vehicle control device 209, a sensor 210, and a charging port 211. As the battery 208, the aforementioned power storage device 1 can be applied. The number of power storage devices 1 may be one or more than one.

The hybrid vehicle 200 runs using the power driving force conversion device 203 as a driving source. An example of the power driving force conversion device 203 corresponds to a motor. By the power from the battery 208, the power driving force conversion device 203 operates, and the rotation force of the power driving force conversion device 203 is transmitted to the driving wheels 204a and 204b. Note that by the use of DC-AC (DC-AC) or the inverse conversion (AC-DC conversion) in the necessary portion, the power driving force conversion device 203 is applicable regardless of whether the device 203 is the AC motor or the DC motor. The sensor 210 controls the engine speed through the vehicle control device 209 or the opening of a throttle valve (throttle opening) that is not shown. The sensors 210 may include a speed sensor, an acceleration sensor, and an engine speed sensor.

The rotating force of the engine 201 is transmitted to the power generator 202, and by the rotating force, the power generated by the power generator 202 can be accumulated in the battery 208.

When the hybrid vehicle is decelerated by a control mechanism, which is not shown, the resistant force at the deceleration is added as the rotating force to the power driving force conversion device 203, and the regenerated power produced from the power driving force conversion device 203 by this rotating force is accumulated in the battery 208.

When the battery 208 is connected to the power source outside the hybrid vehicle, the power is supplied through the charging port 211 from the external power source and the received power can be accumulated in the battery 208.

Although not shown, an information processing device that processes information in regard to the vehicle control based on the information related to the secondary battery may be provided. As the information processing device, for example, an information processing device displaying the battery residual amount based on the battery residual amount is given.

In the above example, the series hybrid car runs by the motor using the power generated by the power generator running on the engine or the power obtained by accumulating the aforementioned power in the battery once. However, the present technique is similarly applicable to the parallel hybrid car that runs on the output of the engine and the motor as a driving source while switching the three methods of the running on the engine only, the running on the motor only, and the running on the engine and motor. Furthermore, the present technique can be applied effectively to the so-called electric vehicle running by the drive of only the driving motor without the use of the engine.

REFERENCE SIGNS LIST

1 Power storage device
2 Fuse
3a Connector
3b Connector
4 External positive electrode terminal
5 External negative electrode terminal
7 Control unit
8 MUX
9 Current detector 9a Current detection resistor
9b Current detection amplifier
10 Battery block group
10a Battery cell
11 Conductive member
12a Plate-shaped projection
12b Plate-shaped projection
13 Support plate
14 Cover
15 Temperature detector
16 MUX
17 Pulse generator
20 Exterior case
20a Front plane portion
20b Rear plane portion
20c Top plane portion
20d Bottom plane portion
20e Side plane portion
20f Side plane portion
21 Protective cover
25a, 25b Window
26a, 26b Window
27 Connector
28 Electronic component
42 Sub-board
44 Output terminal board
45 External communication board
46 Main board
47a1 Bus bar
47a2 Bus bar
47a3 Bus bar
49 Board holding member
51 Battery unit
52 Battery unit
61 Battery case
61a Top case
61b Bottom case
62 Engagement part
62a Engagement part
62b Engagement part
70 Hollow structure body
71 Opening
72 Hole
80 Hollow structure body
91, 91a, 91b Connection terminal portion
91R Coupling portion
91R1 First coupling portion
91R2 Second coupling portion
91R3 Extension portion
92 Positive electrode insulating sheet
93 Partition plate
93a Projection portion
96 Hole
99a Cut portion
99b Notch
100 Power storage system
101 House
102 Concentrated power system
102a Thermal power plant
102b Atomic power plant
102c Hydroelectric power plant
103 Power storage device
104 Power generation device
105 Power consumption device
105a Refrigerator
105b Air conditioner
105c Television receiver
105d Bathroom
106 Electric vehicle
106a Electric car
106b Hybrid car
106c Electric bike
107 Smart meter
108 Power hub
109 Power network
110 Control device
111 Sensor
112 Information network
113 Server
200 Hybrid vehicle
201 Engine
202 Power generator
203 Power driving force conversion device
204a, 204b Driving wheel
205a, 205b Wheel
208 Battery
209 Vehicle control device
210 Sensor
211 Charging port
B1 to B16 Battery block
COM1 Communication unit
CTN1 Module controller
ICNT Control box
ISC1 Insulating unit
L1 to L8 Battery column
MO Power storage device

The invention claimed is:

1. A battery module comprising:
a battery group including a plurality of battery columns, the battery columns include at least a first battery column and a second battery column each including a plurality of battery cells; and
a connection terminal portion coupled with terminal planes of the battery cells, wherein the connection terminal portion includes
a coupling portion including a first coupling portion configured to couple at least with the first battery column and a second coupling portion configured to couple at least with the second battery column adjacent to the first battery column,
wherein the first coupling portion includes a first extension portion that is extended by length substantially equal to a radius of a circumference of an external shape of a battery cell in a longitudinal direction,
a second extension portion extended from an end of the coupling portion in the longitudinal direction,
wherein the second extension portion includes an extension starting end, and wherein a center point (P) of a width of the extension starting end is disposed between a center line and a horizontal distance L/12 from the center line on the second coupling portion,
wherein L is a horizontal distance between the first battery column and the second battery column and the center line is a center line (d) between the first and second battery columns, and
wherein an end of the second extension portion is a sensing position connected with a circuit board, and wherein a voltage of the battery cells is configured to be detected at the sensing position.

2. The battery module according to claim 1, wherein the first and second battery columns are stacked while being displaced in a column direction.

3. The battery module according to claim 2, wherein the first coupling portion is configured to extend in the longitudinal direction.

4. The battery module according to claim 1, wherein the second extension portion is configured to be formed integrally with the coupling portion.

5. The battery module according to claim 1, wherein the second extension portion is an electric conductor coupled with the coupling portion, formed separately from the coupling portion.

6. The battery module according to claim 5, wherein the electric conductor is a conductive wire.

7. A power storage device comprising the battery module according to claim 1.

8. A power storage system comprising the battery module according to claim 1, wherein the power storage system is configured to be charged by a power generation device that generates power from renewable energy.

9. A power storage system comprising the battery module according to claim 1, wherein the power storage system is configured to supply power to an electronic appliance connected to the battery module.

10. An electronic appliance configured to receive power from the battery module according to claim 1.

11. An electric vehicle comprising a conversion device that converts power, received from a power storage device including the battery module according to claim 1, into a driving force of the electric vehicle, and a control device configured to process information associated with vehicle control based on information related to the power storage device.

12. A power system comprising a power information transmission/reception unit configured to transmit and receive signal through a network, wherein charging and discharging of the battery module according to claim 1 is configured to be controlled based on information received by the power information transmission/reception unit.

13. A power system configured to receive power from the battery module according to claim 1 and supply power from at least one of a power generation device and a power network to the battery module.

14. A connection terminal portion for a battery module comprising:
   a coupling portion including a first coupling portion configured to couple at least with a first battery column and a second coupling portion configured to couple at least with a second battery column adjacent to the first battery column,
   wherein the first coupling portion includes a first extension portion that is extended by length substantially equal to a radius of a circumference of an external shape of a battery cell in a longitudinal direction,
   a second extension portion extended from an end of the coupling portion in a longitudinal direction,
   wherein the second extension portion includes an extension starting end, and wherein a center point (P) of a width of the extension starting end is disposed between a center line and a horizontal distance L/12 from the center line on the second coupling portion,
   wherein L is a horizontal distance between the first battery column and the second battery column and the center line is a center line (d) between the first and second battery columns, and
   wherein an end of the second extension portion is a sensing position connected with a circuit board, and wherein a voltage of the battery cells is configured to be detected at the sensing position.

15. The battery module according to claim 1, wherein the second extension portion has a width smaller than the first coupling portion and the second coupling portion.

* * * * *